US012338412B2

(12) United States Patent
Delaney et al.

(10) Patent No.: US 12,338,412 B2
(45) Date of Patent: *Jun. 24, 2025

(54) LOW PH DETERGENT COMPOSITION

(71) Applicant: The Procter & Gamble Company, Cincinnati, OH (US)

(72) Inventors: Sarah Ann Delaney, Hebron, KY (US); James William Holder, Fort Thomas, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 209 days.

This patent is subject to a terminal disclaimer.

(21) Appl. No.: 16/683,493

(22) Filed: Nov. 14, 2019

(65) Prior Publication Data

US 2020/0109350 A1 Apr. 9, 2020

Related U.S. Application Data

(63) Continuation of application No. 14/284,419, filed on May 22, 2014, now Pat. No. 10,519,400.

(60) Provisional application No. 61/827,147, filed on May 24, 2013.

(51) Int. Cl.

| | |
|---|---|
| ***C11D 1/00*** | (2006.01) |
| ***C11D 3/20*** | (2006.01) |
| ***C11D 3/30*** | (2006.01) |
| ***C11D 3/37*** | (2006.01) |
| *C11D 1/14* | (2006.01) |
| *C11D 1/29* | (2006.01) |

(52) U.S. Cl.

CPC ............ *C11D 1/002* (2013.01); *C11D 3/2075* (2013.01); *C11D 3/30* (2013.01); *C11D 3/3723* (2013.01); *C11D 3/3796* (2013.01); *C11D 1/146* (2013.01); *C11D 1/29* (2013.01)

(58) Field of Classification Search

CPC ......... C11D 1/002; C11D 3/2075; C11D 3/30; C11D 3/3723; C11D 3/3796

See application file for complete search history.

(56) References Cited

U.S. PATENT DOCUMENTS

| | | | | |
|---|---|---|---|---|
| 2,493,445 | A | | 1/1950 | Randolph |
| 3,600,318 | A | | 8/1971 | Mast |
| 3,650,968 | A | | 3/1972 | Hoffman |
| 4,242,215 | A | | 12/1980 | Aalbers |
| 4,285,841 | A | | 8/1981 | Barrat |
| 4,486,195 | A | | 12/1984 | Weinstein |
| 4,529,525 | A | | 7/1985 | Dormal |
| 4,737,314 | A | | 4/1988 | Yokoyama |
| 5,057,246 | A | | 10/1991 | Bertho |
| 5,466,851 | A | | 11/1995 | Adams |
| 5,484,555 | A | | 1/1996 | Schepers |
| 5,536,438 | A | | 7/1996 | Scialla |
| 5,559,090 | A | | 9/1996 | Scialla |
| 5,565,145 | A | | 10/1996 | Watson |
| 5,641,739 | A | | 6/1997 | Kott |
| 5,759,989 | A | | 6/1998 | Scialla |
| 5,858,948 | A | * | 1/1999 | Ghosh .................. C11D 3/0036 510/300 |
| 5,880,079 | A | | 3/1999 | Polotti et al. |
| 5,928,384 | A | | 7/1999 | Scialla et al. |
| 5,972,869 | A | | 10/1999 | Cao |
| 6,037,317 | A | | 3/2000 | Rapisarda |
| 6,054,424 | A | | 4/2000 | Ip |
| 6,060,443 | A | | 5/2000 | Cripe |
| 6,066,610 | A | | 5/2000 | Sramek |
| 6,069,123 | A | | 5/2000 | Masotti et al. |
| 6,159,925 | A | | 12/2000 | Blandiaux |
| 6,183,757 | B1 | * | 2/2001 | Beerse ................... A61K 8/365 510/159 |
| 6,239,092 | B1 | | 5/2001 | Papasso |
| 6,251,844 | B1 | | 6/2001 | Leonard |
| 6,262,007 | B1 | | 7/2001 | Scialla |
| 6,303,556 | B1 | | 10/2001 | Kott |
| 6,313,085 | B1 | | 11/2001 | Le |
| 6,376,449 | B2 | | 4/2002 | Olsen |
| 6,451,064 | B1 | | 9/2002 | Del |
| 6,521,577 | B1 | | 2/2003 | Ofosu-asante |
| 6,525,012 | B2 | | 2/2003 | Price |
| 6,627,590 | B1 | | 9/2003 | Sherry |
| 6,630,435 | B1 | | 10/2003 | Gagliardini |
| 6,740,630 | B2 | | 5/2004 | Aouad |
| 6,797,685 | B2 | | 9/2004 | Zhu |
| 7,148,187 | B1 | | 12/2006 | Simon |
| 7,820,610 | B2 | | 10/2010 | Showell |
| 8,026,203 | B2 | | 9/2011 | Courchay |
| 8,097,579 | B2 | | 1/2012 | Danziger |

(Continued)

FOREIGN PATENT DOCUMENTS

| | | | |
|---|---|---|---|
| DE | 19822688 | A1 | 11/1999 |
| DE | 10032588 | A1 | 1/2002 |

(Continued)

OTHER PUBLICATIONS

All Office Actions; U.S. Appl. No. 14/284,418.

All Office Actions; U.S. Appl. No. 14/284,419.

International Search Report and Written Opinion; Application Ser. No. PCT/US2014/039098; dated Sep. 26, 2014, 12 pages.

J. Chem. Soc., Faraday Trans. I, 1983, 79, 953-964; "Kinetics of the Acid-catalysed Hydrolysis of Dodecylsulphate and Dodecyldiethoxysulphate Surfactantsin Concentrated Micellar Solutions"; Christopher J. Garnet.

J. Chem. Soc., Perkin Trans. 2, 2001, 1489-1495; "The hydrolysis of C12 primary alkyl sulfates in concentratedaqueous solutions. Part 1. General features, kinetic form andmode of catalysis in sodium dodecyl sulfate hydrolysis"; Donald Bethell.

(Continued)

*Primary Examiner* — Necholus Ogden, Jr.

(74) *Attorney, Agent, or Firm* — Andres Ernesto Velarde; Andrew J. Mueller

(57) ABSTRACT

Detergent compositions and more specifically, to low pH detergent compositions comprising sulfated surfactants, organic acid, and polyamine compounds. Methods of making and using the same.

12 Claims, No Drawings

(56) References Cited

U.S. PATENT DOCUMENTS

| | | | |
|---|---|---|---|
| 8,729,007 | B2 | 5/2014 | Sadlowski |
| 10,149,985 | B2 | 12/2018 | Piergallini et al. |
| 10,519,400 | B2 | 12/2019 | Delaney et al. |
| 2002/0107167 | A1 | 8/2002 | Aizawa |
| 2003/0185783 | A1* | 10/2003 | Terazaki ................ A61K 8/345 424/70.22 |
| 2004/0072718 | A1 | 4/2004 | Price et al. |
| 2004/0092413 | A1 | 5/2004 | Ticktin |
| 2004/0092422 | A1 | 5/2004 | Carr |
| 2006/0040837 | A1 | 2/2006 | Frantz |
| 2006/0111261 | A1 | 5/2006 | Sadlowski |
| 2006/0234898 | A1* | 10/2006 | Schneiderman ......... C11D 1/83 510/424 |
| 2006/0251605 | A1 | 11/2006 | Belmar |
| 2008/0015135 | A1 | 1/2008 | De Buzzaccarini |
| 2008/0139434 | A1 | 6/2008 | Basappa |
| 2008/0178396 | A1 | 7/2008 | Van Der Linden et al. |
| 2008/0248988 | A1 | 10/2008 | Gambogi |
| 2009/0215854 | A1 | 8/2009 | Pan |
| 2009/0298739 | A1* | 12/2009 | Courchay ............... C11D 11/04 510/357 |
| 2009/0312227 | A1 | 12/2009 | Murphy |
| 2010/0003198 | A1* | 1/2010 | Stolmeier ............ A61K 31/045 424/10.3 |
| 2010/0093595 | A1 | 4/2010 | Holzhauer |
| 2010/0303739 | A1 | 12/2010 | Spoerer |
| 2011/0061174 | A1* | 3/2011 | Boutique ................. C11D 3/42 8/137 |
| 2011/0075466 | A1 | 3/2011 | Thorp |
| 2011/0146707 | A1* | 6/2011 | Cermenati ............. C11D 7/265 134/6 |
| 2011/0146725 | A1 | 6/2011 | Woo |
| 2011/0220536 | A1 | 9/2011 | Fernandez-prieto et al. |
| 2013/0061402 | A1 | 3/2013 | Frankenbach |
| 2013/0184195 | A1 | 7/2013 | Sadlowski |
| 2013/0267451 | A1 | 10/2013 | Hardy |
| 2013/0281344 | A1 | 10/2013 | Tarng |
| 2013/0305461 | A1 | 11/2013 | Scartozzi |
| 2014/0026331 | A1 | 1/2014 | Frankenbach |
| 2014/0148372 | A1* | 5/2014 | Man ....................... C11D 1/146 510/407 |
| 2014/0349908 | A1 | 11/2014 | Delaney et al. |
| 2014/0349913 | A1 | 11/2014 | Delaney |

FOREIGN PATENT DOCUMENTS

| | | | |
|---|---|---|---|
| EP | 0019315 | A1 | 11/1980 |
| EP | 0518401 | A1 | 12/1992 |
| EP | 0619366 | A1 | 10/1994 |
| EP | 0666308 | A3 | 6/1996 |
| EP | 0781836 | A1 | 7/1997 |
| EP | 0839903 | A1 | 5/1998 |
| EP | 0908511 | A1 | 4/1999 |
| EP | 1696023 | B1 | 4/2008 |
| EP | 2522714 | A1 | 11/2012 |
| GB | 1489694 | A | 10/1977 |
| GB | 2205578 | A | 12/1988 |
| JP | 2000192092 | A | 7/2000 |
| JP | 2002053894 | A | 2/2002 |
| JP | 2007308592 | A | 11/2007 |
| JP | 2012092163 | A | 5/2012 |
| WO | WO9116409 | A1 | 10/1991 |
| WO | WO9401520 | A1 | 1/1994 |
| WO | 9509225 | A1 | 4/1995 |
| WO | WO9827189 | A1 | 6/1998 |
| WO | 9910457 | A1 | 3/1999 |
| WO | WO9909944 | A1 | 3/1999 |
| WO | WO0071667 | A1 | 11/2000 |
| WO | WO0100758 | A2 | 1/2001 |
| WO | WO0105874 | A1 | 1/2001 |
| WO | WO2002050225 | A1 | 6/2002 |
| WO | WO2006055788 | A1 | 5/2006 |
| WO | WO2007107191 | A1 | 9/2007 |
| WO | WO2008068222 | A1 | 6/2008 |
| WO | 2009095823 | A1 | 8/2009 |
| WO | WO2009148914 | A1 | 12/2009 |
| WO | WO2011027721 | A1 | 3/2011 |
| WO | 2011075556 | A1 | 6/2011 |
| WO | 2011098356 | A1 | 8/2011 |
| WO | 2011161618 | A1 | 12/2011 |
| WO | WO2012122232 | A4 | 11/2012 |
| WO | WO2013041832 | A1 | 3/2013 |
| WO | WO2013092049 | A1 | 6/2013 |
| WO | WO2013142486 | A1 | 9/2013 |
| WO | WO2014018309 | A1 | 1/2014 |
| WO | WO2011032138 | A3 | 3/2014 |

OTHER PUBLICATIONS

Third Party Opposition filed for European Patent Application Ser. No. 14730720.1, Dated Apr. 20, 2022; 13 pages.

* cited by examiner

LOW PH DETERGENT COMPOSITION

FIELD OF THE INVENTION

The present disclosure relates to detergent compositions and, more specifically, to low pH detergent compositions comprising sulfated surfactant. The present disclosure also relates to methods of making and using the same.

BACKGROUND OF THE INVENTION

Traditionally, detergent compositions have been formulated to a composition pH of greater than about 7. A basic pH helps to ensure that the surfactant systems, enzymes, or other organic solvents remain solubilized in the wash water. Furthermore, a basic pH helps to ensure that greasy or oily stains removed from soiled clothing are dispersed in the wash water.

However, it has been found that certain acidic detergents (i.e., with pH less than about 7) may provide benefits, such as improved removal of residues from fabrics and associated improvement in whiteness, improved bleachable stain removal, and self-preservation benefits. Such acidic detergents have often employed surfactants such as linear alkyl benzene sulfonates (LAS), which remain stable at low pHs. On the other hand, sulfated surfactants, such as alkyl sulfate (AS) and alkyl ethoxylated sulfate (AES), have generally been avoided in low pH detergents because sulfated surfactants are known to be susceptible to hydrolysis, particularly at acidic pHs. The use of sulfated surfactants is desirable, however, because sulfated surfactants may provide benefits, such as cleaning performance and sudsing capabilities. There exists a need, therefore, for sulfated surfactant compositions with improved chemical stability at acidic pHs.

Additionally, consumers continue to desire whiteness benefits from laundry detergents. Bleach is capable of delivering whiteness benefits but presents formulation challenges in liquid compositions. It is known that certain performance polymers, such as polyamine compounds, may be used to provide cleaning and/or whiteness benefits as an alternative to bleach.

It has surprisingly been discovered that certain polyamine compounds, in addition to providing cleaning and/or whitening benefits, are capable of stabilizing sulfated surfactants in low pH detergents.

Furthermore, many consumers launder fabrics by hand. Such consumers may desire detergents that provide mildness to the skin, a desirable feel while washing, and suds that form while washing but are readily rinsed away. It has been found that low pH detergents comprising sulfated surfactants and certain polyamine compounds can address one or more of these needs.

SUMMARY OF THE INVENTION

The present disclosure relates to a detergent composition comprising: from about 1% to about 50% of a sulfated surfactant; an organic acid; and from about 0.25% to about 10% of an alkalizing agent, where the composition has a pH of from about 2 to about 6 when measured neat; and where the composition is substantially free of peroxide bleach.

The present disclosure also relates to a method of treating a surface comprising the step of contacting the surface with the compositions described in this disclosure.

DETAILED DESCRIPTION OF THE INVENTION

In this description, all concentrations and ratios are on a weight basis of the detergent composition unless otherwise specified. Elemental compositions such as percentage nitrogen (% N) are percentages by weight.

Molecular weights of polymers are number average molecular weights unless otherwise specifically indicated.

As used herein, the articles "a" and "an" when used in a claim, are understood to mean one or more of what is claimed or described.

As used herein, the terms "include," "includes," and "including" are meant to be non-limiting.

The compositions of the present invention can comprise, consist essentially of, or consist of, the components of the present disclosure.

Unless otherwise noted, all component or composition levels are in reference to the active portion of that component or composition, and are exclusive of impurities, for example, residual solvents or by-products, which may be present in commercially available sources of such components or compositions.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The terms "substantially free of" or "substantially free from" may be used herein. This means that the indicated material is at the very minimum not deliberately added to the composition to form part of it, or, more typically, is not present at analytically detectable levels. It is meant to include compositions whereby the indicated material is present only as an impurity in one of the other materials deliberately included.

Detergent Composition

The detergent compositions disclosed herein are low pH detergent compositions comprising sulfated surfactants, organic acid, and alkoxylated polyamine compounds. Sulfated surfactants provide, for example, cleaning benefits in compositions suitable for cleaning hard surfaces and/or laundry. In order to provide effective cleaning, especially for laundry, it is desirable for the sulfated surfactants to have alkyl groups of certain chain lengths, for example, at least 10 carbons, or at least 12 carbons, or at least 14 carbons. However, it is believed that longer alkyl chains tend to lead to more interfaces forming between the sulfated surfactants. This can present stability challenges as sulfated surfactants tend to hydrolyze in low pH systems, believed to be due in part to the interfaces between the surfactants. It has been surprisingly discovered that certain alkoxylated polyamine compounds can reduce the rate of hydrolysis. It is believed that the polyamines provide a stabilizing effect by interrupting $H^+$ access to the interface and/or by interrupting the interactions between the sulfated surfactants.

As used herein the phrase "detergent composition" includes compositions and formulations designed for cleaning soiled material. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, dish washing compositions, hard surface cleaning compositions, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation. The cleaning compositions may have a form selected from liquid, single-phase or multi-phase unit dose, pouch, gel, or paste. When the compositions are in a unit dose form, the composition may be encapsulated in a water-soluble film or pouch; the water-soluble film or pouch may comprise polyvinyl alcohol, polyvinyl acetate, or mixtures thereof. The unit dose form may comprise at least two compartments, or at least three compartments. At least one compartment may be superimposed on another compartment.

In some aspects, the compositions comprise from about 50% to about 95%, or from about 60% to about 90%, or from about 65% to about 81%, by weight of the composition, water. In some aspects, the compositions comprise at least about 50%, or at least about 60%, or at least about 70%, or at least about 75%, or at least about 80%, or at least about 85% water. When the composition is in concentrated or unit dose form, the composition may comprise less than about 50% water, or less than about 30% water, or less than about 20% water, or less than about 10% water, or less than about 5% water.

In some aspects, the compositions are present in a single phase. In some aspects, the disclosed compositions are isotropic at 22° C. As used herein, "isotropic" means a clear mixture, having a % transmittance of greater than 50% at a wavelength of 570 nm measured via a standard 10 mm pathlength cuvette with a Beckman DU spectrophotometer, in the absence of dyes and/or opacifiers.

Surfactant

The detergent compositions of the present invention comprise a detersive surfactant. The detergent composition may comprise from about 1% to about 50%, or from about 5% to about 20%, or from about 8% to about 18%, or from about 10% to about 15%, by weight of the composition, of detersive surfactant. The detersive surfactant comprises at least one sulfated surfactant. Typically, the surfactant comprises a sulfated surfactant and a non-sulfated surfactant. The non-sulfated surfactant may be selected from anionic surfactants, nonionic surfactants, cationic surfactants, zwitterionic surfactants, amphoteric surfactants, ampholytic surfactants, or mixtures thereof. Those of ordinary skill in the art will understand that a detersive surfactant encompasses any surfactant or mixture of surfactants that provide cleaning, stain removing, or laundering benefit to soiled material.

Sulfated Surfactant

The detergent compositions of the present invention comprise a sulfated surfactant. The sulfated surfactant may be selected from alkyl sulfate, alkyl alkoxylated sulfate, or mixtures thereof. In some aspects, the detergent compositions of the present invention comprise from about 0.1% to about 50%, or from about 5% to about 35%, or from about 8% to about 20%, or from about 10% to about 15%, or from about 0.5% to about 10%, or from about 1% to about 8%, by weight of the composition, of sulfated surfactant.

In some aspects, the sulfated surfactant comprises alkyl alkoxylated sulfate. The alkyl alkoxylated sulfate may be ethoxylated, propoxylated, or a mixture thereof. In some aspects, the sulfated surfactant comprises alkyl ethoxylated sulfate ("AES"). Such materials, also known as alkyl ether sulfate or alkyl polyethoxylate sulfate, typically correspond to the formula: $R'—O—(C_2H_4O)_n—SO_3M$, where R' is a $C_8$-$C_{20}$ alkyl group, n is from about 1 to about 30, and M is a salt-forming cation. In some aspects, R' is $C_{10}$-$C_{18}$ alkyl, n is from about 1 to about 15, and M is sodium, potassium, ammonium, alkylammonium, or alkanolammonium. In some aspects, R' is a $C_{12}$-$C_{16}$ alkyl, n is from about 1 to about 6, and M is sodium. In some aspects, R' is a $C_{14}$-$C_{20}$ alkyl group. In some aspects, the composition is substantially free of AES surfactants that comprise alkyl groups of fewer than 14 carbon atoms, or fewer than 13 carbon atoms, or fewer than 11 carbon atoms.

In some aspects, the sulfated surfactant comprises alkyl sulfate ("AS"). For example, the alkyl ether sulfates described above are generally available in the form of mixtures comprising varying R' chain lengths and varying degrees of ethoxylation. Frequently, these mixtures also contain some non-ethoxylated alkyl sulfate materials, i.e., surfactants of the above ethoxylated alkyl sulfate formula where n=0.

Non-ethoxylated alkyl sulfates (AS) may also be added separately to the compositions of this invention. Specific examples of alkyl sulfate surfactants are those produced by the sulfation of higher $C_5$-$C_{20}$ fatty alcohols. Conventional primary alkyl sulfate surfactants have the general formula: $ROSO_3^-M^+$, where R is a $C_8$-$C_{20}$ alkyl group, which may be straight chain, and M is a water-solubilizing cation. In some aspects, R is a $C_{10}$-$C_{16}$ alkyl group and M is alkali metal, more typically R is $C_{12}$-$C_{14}$ alkyl and M is sodium. In some aspects, the composition is substantially free of AS surfactants comprising alkyl groups having fewer than 14 carbons atoms, or fewer than 13 carbon atoms, or fewer than 11 carbon atoms. In some aspects, the sulfated surfactant comprises an AS surfactant where R is a $C_{14}$-$C_{20}$ alkyl group.

The sulfated surfactant may be linear, branched, or a mixture thereof. Branched surfactants are described in more detail below.

Non-Sulfated Surfactant

In some aspects, the detergent composition comprises a non-sulfated surfactant. As used in the present disclosure, "non-sulfated surfactants" may include non-sulfated anionic surfactants, such as sulfonic detersive surfactants, e.g., alkyl benzene sulfonates as well as nonionic surfactants, cationic surfactants, zwitterionic surfactants, amphoteric surfactants, ampholytic surfactants, or mixtures thereof. In some aspects, the composition may comprise from about 1% to about 50%, or from about 5% to about 35%, or from about 8% to about 20%, or from about 10% to about 15%, by weight of the composition, of a non-sulfated surfactant. In some aspects, the composition is substantially free of non-sulfated surfactant.

In some aspects, the non-sulfated surfactant may be a non-sulfated anionic surfactant. The composition may comprise from about 0.1% to about 20%, or from 1% to about 15%, by weight of the composition, of non-sulfated anionic surfactant. Useful non-sulfated anionic surfactants are disclosed in, for example, U.S. Pat. No. 4,285,841, Barrat et al., issued Aug. 25, 1981, and in U.S. Pat. No. 3,919,678, Laughlin, et al., issued Dec. 30, 1975.

Suitable non-sulfated anionic surfactants include alkyl benzene sulfonic acids and their salts. Exemplary anionic surfactants are the alkali metal salts of $C_{10-16}$ alkyl benzene sulfonic acids, particularly $C_{11-14}$ alkyl benzene sulfonic acids. Typically, the alkyl group is linear; such linear alkyl benzene sulfonates are known as "LAS". Alkyl benzene sulfonates, and particularly LAS, are well known in the art. Such surfactants and their preparation are described in, for example, U.S. Pat. Nos. 2,220,099 and 2,477,383. In one aspect, the alkyl benzene sulfonate surfactant is selected from sodium and potassium linear straight chain alkylbenzene sulfonates in which the average number of carbon atoms in the alkyl group is from about 11 to about 14 (Sodium $C_{11}$-$C_{14}$). For example, $C_{12}$ LAS is a specific example of such surfactant.

In some aspects, the non-sulfated anionic surfactant comprises the water-soluble salts, particularly the alkali metal, ammonium, and alkylolammonium (e.g., monoethanolammonium or triethanolammonium) salts, of organic sulfuric reaction products having in their molecular structure an alkyl group containing from about 10 to about 20 carbon atoms and a sulfonic acid group. (Included in the term "alkyl" is the alkyl portion of aryl groups.) Other anionic surfactants useful herein are the water-soluble salts of: paraffin sulfonates and secondary alkane sulfonates containing from about 8 to about 24 (typically about 12 to about 18) carbon atoms and alkyl glyceryl ether sulfonates, especially those ethers of $C_{8-18}$ alcohols (e.g., those derived from tallow and coconut oil).

Mixtures of the alkylbenzene sulfonates with the above-described paraffin sulfonates, secondary alkane sulfonates and alkyl glyceryl ether sulfonates are also useful.

In some aspects, the non-sulfated anionic surfactant comprises fatty acid. Examples of fatty acids include saturated and mono- and polyunsaturated carboxylic acids having from about 8 to about 28, or from about 12 to about 26, or from about 12 to about 22 carbon atoms and their salts. The fatty acid may be selected from caprylic acid, perlargonic acid, capric acid, undecanoic acid, lauric acid, tridecanoic acid, myritic acid, petadecanoic acid, palmitic acid, margaric acid, stearic acid, nonadecanoic acid, arachic acid, behenic acid saturated fatty acids, palmitoelic acid, oleic acid, erucic acid, linoleic acid, linolenic acid, or mixtures thereof. In other aspects, the detergent compositions are substantially free of fatty acids.

Specific, non-limiting examples of non-sulfated anionic surfactants useful herein include: a) $C_{10}$-$C_{18}$ alkyl benzene sulfonates (LAS), including those in which the alkyl groups have a bio-based content of at least 5% (Bio-LAS and/or Bio-MLAS) b) $C_{10}$-$C_{18}$ alkyl alkoxy carboxylates in one aspect, comprising 1-5 ethoxy units; c) modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; d) methyl ester sulfonate (MES); and e) alpha-olefin sulfonate (AOS).

In some aspects, the non-sulfated surfactant may be a nonionic surfactant. Nonionic surfactants may provide chemical stability benefits to sulfated surfactant compositions. It is believed that ethoxylated nonionic surfactant may provide physical stability benefits to the detergent composition, e.g., preventing phase splits and precipitation. This may be particularly true for compositions containing high levels of quaternary ammonium agent and/or low levels of anionic surfactant. Therefore, in some aspects, the detergent compositions comprise at least about 0.1%, or from about 1% to about 20%, or from about 1.5% to about 15%, or from about 2% to about 12%, by weight of the detergent composition, of a nonionic surfactant. In other aspects, the detergent compositions are substantially free of nonionic surfactant.

Suitable nonionic surfactants useful herein can comprise any conventional nonionic surfactant used in detergent products. These include alkoxylated fatty alcohols and amine oxide surfactants. Generally, the nonionic surfactants are liquid.

Suitable nonionic surfactants for use herein include the alcohol alkoxylate nonionic surfactants. Alcohol alkoxylates are materials which correspond to the general formula: $R^1(C_mH_{2m}O)_nOH$ where $R^1$ is a $C_8$-$C_{16}$ alkyl group, m is from 2 to 4, and n ranges from about 2 to about 12. Typically, $R^1$ is an alkyl group, which may be primary or secondary, that contains from about 9 to about 18 carbon atoms, more typically from about 10 to about 14 carbon atoms. In one aspect, the alkoxylated fatty alcohols are ethoxylated materials that contain from about 2 to about 12 ethylene oxide moieties per molecule, alternatively from about 3 to about 10 ethylene oxide moieties per molecule. The alkoxylated fatty alcohol materials useful in the detergent compositions herein frequently have a hydrophilic-lipophilic balance (HLB) ranging from about about 3 to about 17, or about 6 to about 15, or about 8 to about 15. Alkoxylated fatty alcohol nonionic surfactants have been marketed under the tradenames NEODOL and DOBANOL by the Shell Chemical Company.

Another suitable type of nonionic surfactant is amine oxide. Amine oxides are often referred to in the art as "semi-polar" nonionics. Amine oxides have the formula: $R(EO)_x(PO)_y(BO)_zN(O)(CH_2R')_2{\cdot}qH_2O$. In this formula, R is a relatively long-chain hydrocarbyl moiety which can be saturated or unsaturated, linear or branched, and can contain from 8 to 20, or from 10 to 16 carbon atoms, and is alternatively a $C_{12}$-$C_{16}$ primary alkyl. R' is a short-chain moiety, and may be selected from hydrogen, methyl or —$CH_2OH$. When x+y+z is different from 0, EO is ethyleneoxy, PO is propyleneneoxy and BO is butyleneoxy. Amine oxide surfactants are illustrated by $C_{12-14}$ alkyldimethyl amine oxide.

Non-limiting examples of nonionic surfactants useful herein include: a) $C_{12}$-$C_{18}$ alkyl ethoxylates, such as, NEODOL® nonionic surfactants from Shell; b) $C_6$-$C_{12}$ alkyl phenol alkoxylates where the alkoxylate units are a mixture of ethyleneoxy and propyleneoxy units; c) $C_{12}$-$C_{18}$ alcohol and $C_6$-$C_{12}$ alkyl phenol condensates with ethylene oxide/propylene oxide block polymers such as Pluronic® from BASF; d) alkylpolysaccharides as discussed in U.S. Pat. No. 4,565,647 to Llenado, issued Jan. 26, 1986, or specifically alkylpolyglycosides as discussed in U.S. Pat. Nos. 4,483,780 and 4,483,779; e) polyhydroxy fatty acid amides as discussed in U.S. Pat. No. 5,332,528, WO 92/06162, WO 93/19146, WO 93/19038, and WO 94/09099; and f) ether capped poly(oxyalkylated) alcohol surfactants as discussed in U.S. Pat. No. 6,482,994 and WO 01/42408.

In some aspects, the composition comprises cationic surfactant. Cationic surfactants are well known in the art, and non-limiting examples include quaternary ammonium surfactants, which can have up to about 26 carbon atoms. Additional examples include a) alkoxylate quaternary ammonium (AQA) surfactants as discussed in U.S. Pat. No. 6,136,769; b) dimethyl hydroxyethyl quaternary ammonium as discussed in 6,004,922; c) trimethyl quaternary ammonium such as lauryl trimethyl quaternary ammonium d) polyamine cationic surfactants as discussed in WO 98/35002, WO 98/35003, WO 98/35004, WO 98/35005, and WO 98/35006; e) cationic ester surfactants as discussed in U.S. Pat. Nos. 4,228,042, 4,239,660 4,260,529 and U.S. Pat. No. 6,022,844; and e) amino surfactants as discussed in U.S. Pat. No. 6,221,825 and WO 00/47708, specifically amido propyldimethyl amine (APA). The componsision may comprise from about 0.1% to about 2%, or from about 0.2% to about 1%, by weight of the composition, cationic surfactant.

Zwitterionic Surfactants

Examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 at column 19, line 38 through column 22, line 48, for examples of zwitterionic surfactants; betaines, including alkyl dimethyl betaine and cocodimethyl amidopropyl betaine, $C_8$ to $C_{18}$ (for example from $C_{12}$ to $C_{18}$) amine oxides and sulfo and hydroxy betaines, such as N-alkyl-N,N-dimethylammino-1-propane sulfonate where the alkyl group can be $C_8$ to $C_{18}$ and in certain embodiments from $C_{10}$ to $C_{14}$.

Ampholytic Surfactants

Specific, non-limiting examples of ampholytic surfactants include: aliphatic derivatives of secondary or tertiary amines, or aliphatic derivatives of heterocyclic secondary and tertiary amines in which the aliphatic radical can be straight- or branched-chain. One of the aliphatic substituents may contain at least about 8 carbon atoms, for example from about 8 to about 18 carbon atoms, and at least one contains an anionic water-solubilizing group, e.g. carboxy, sulfonate, sulfate. See U.S. Pat. No. 3,929,678 at column 19, lines 18-35, for suitable examples of ampholytic surfactants.

Amphoteric Surfactants

Examples of amphoteric surfactants include: aliphatic derivatives of secondary or tertiary amines, or aliphatic derivatives of heterocyclic secondary and tertiary amines in which the aliphatic radical can be straight- or branched-chain. One of the aliphatic substituents contains at least about 8 carbon atoms, typically from about 8 to about 18 carbon atoms, and at least one contains an anionic water-solubilizing group, e.g. carboxy, sulfonate, sulfate. Examples of compounds falling within this definition are sodium 3-(dodecylamino)propionate, sodium 3-(dodecylamino) propane-1-sulfonate, sodium 2-(dodecylamino) ethyl sulfate, sodium 2-(dimethylamino) octadecanoate, disodium 3-(N-carboxymethyldodecylamino)propane 1-sulfonate, disodium octadecyl-imminodiacetate, sodium 1-carboxymethyl-2-undecylimidazole, and sodium N,N-bis (2-hydroxyethyl)-2-sulfato-3-dodecoxypropylamine. See U.S. Pat. No. 3,929,678 to Laughlin et al., issued Dec. 30, 1975 at column 19, lines 18-35, for examples of amphoteric surfactants.

Branched Surfactants

Suitable branched detersive surfactants include anionic branched surfactants selected from branched sulphate or branched sulphonate surfactants, e.g., branched alkyl sulphate, branched alkyl alkoxylated sulphate, and branched alkyl benzene sulphonates, comprising one or more random alkyl branches, e.g., $C_{1-4}$ alkyl groups, typically methyl and/or ethyl groups.

In some aspects, the branched detersive surfactant is a mid-chain branched detersive surfactant, typically, a mid-chain branched anionic detersive surfactant, for example, a mid-chain branched alkyl sulphate and/or a mid-chain branched alkyl benzene sulphonate. In some aspects, the detersive surfactant is a mid-chain branched alkyl sulphate. In some aspects, the mid-chain branches are $C_{1-4}$ alkyl groups, typically methyl and/or ethyl groups.

In some aspects, the branched surfactant comprises a longer alkyl chain, mid-chain branched surfactant compound of the formula:

$A_b$-X—B where:

(a) $A_b$ is a hydrophobic C9 to C22 (total carbons in the moiety), typically from about C12 to about C18, mid-chain branched alkyl moiety having: (1) a longest linear carbon chain attached to the —X—B moiety in the range of from 8 to 21 carbon atoms; (2) one or more C1-C3 alkyl moieties branching from this longest linear carbon chain; (3) at least one of the branching alkyl moieties is attached directly to a carbon of the longest linear carbon chain at a position within the range of position 2 carbon (counting from carbon #1 which is attached to the —X—B moiety) to position ω-2 carbon (the terminal carbon minus 2 carbons, i.e., the third carbon from the end of the longest linear carbon chain); and (4) the surfactant composition has an average total number of carbon atoms in the $A_b$-X moiety in the above formula within the range of greater than 14.5 to about 17.5 (typically from about 15 to about 17);

b) B is a hydrophilic moiety selected from sulfates, sulfonates, amine oxides, polyoxyalkylene (such as polyoxyethylene and polyoxypropylene), alkoxylated sulfates, polyhydroxy moieties, phosphate esters, glycerol sulfonates, polygluconates, polyphosphate esters, phosphonates, sulfosuccinates, sulfosuccaminates, polyalkoxylated carboxylates, glucamides, taurinates, sarcosinates, glycinates, isethionates, dialkanolamides, monoalkanolamides, monoalkanolamide sulfates, diglycolamides, diglycolamide sulfates, glycerol esters, glycerol ester sulfates, glycerol ethers, glycerol ether sulfates, polyglycerol ethers, polyglycerol ether sulfates, sorbitan esters, polyalkoxylated sorbitan esters, ammonioalkanesulfonates, amidopropyl betaines, alkylated quats, alkylated/polyhydroxyalkylated quats, alkylated/polyhydroxylated oxypropyl quats, imidazolines, 2-yl-succinates, sulfonated alkyl esters, and sulfonated fatty acids (it is to be noted that more than one hydrophobic moiety may be attached to B, for example as in $(A_b\text{-}X)_z$—B to give dimethyl quats); and (c) X is selected from —CH2- and —C(O)—.

Generally, in the above formula the $A_b$ moiety does not have any quaternary substituted carbon atoms (i.e., 4 carbon atoms directly attached to one carbon atom). Depending on which hydrophilic moiety (B) is selected, the resultant surfactant may be anionic, nonionic, cationic, zwitterionic, amphoteric, or ampholytic. In some aspects, B is sulfate and the resultant surfactant is anionic.

In some aspects, the branched surfactant comprises a longer alkyl chain, mid-chain branched surfactant compound of the above formula wherein the $A_b$ moiety is a branched primary alkyl moiety having the formula:

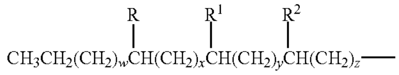

wherein the total number of carbon atoms in the branched primary alkyl moiety of this formula (including the R, $R^1$, and $R^2$ branching) is from 13 to 19; R, R1, and R2 are each independently selected from hydrogen and C1-C3 alkyl (typically methyl), provided R, R1, and R2 are not all hydrogen and, when z is 0, at least R or R1 is not hydrogen; w is an integer from 0 to 13; x is an integer from 0 to 13; y is an integer from 0 to 13; z is an integer from 0 to 13; and w+x+y+z is from 7 to 13.

In certain aspects, the branched surfactant comprises a longer alkyl chain, mid-chain branched surfactant compound of the above formula wherein the $A_b$ moiety is a branched primary alkyl moiety having the formula selected from:

(I)

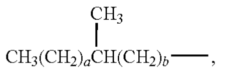

(II)

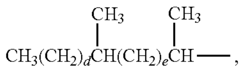

or mixtures thereof; wherein a, b, d, and e are integers, a+b is from 10 to 16, d+e is from 8 to 14 and wherein further when a+b=10, a is an integer from 2 to 9 and b is an integer from 1 to 8;

when a+b=11, a is an integer from 2 to 10 and b is an integer from 1 to 9;

when a+b=12, a is an integer from 2 to 11 and b is an integer from 1 to 10;

when a+b=13, a is an integer from 2 to 12 and b is an integer from 1 to 11;

when a+b=14, a is an integer from 2 to 13 and b is an integer from 1 to 12;

when a+b=15, a is an integer from 2 to 14 and b is an integer from 1 to 13;

when a+b=16, a is an integer from 2 to 15 and b is an integer from 1 to 14;

when d+e=8, d is an integer from 2 to 7 and e is an integer from 1 to 6;

when d+e=9, d is an integer from 2 to 8 and e is an integer from 1 to 7;

when d+e=10, d is an integer from 2 to 9 and e is an integer from 1 to 8;

when d+e=11, d is an integer from 2 to 10 and e is an integer from 1 to 9;

when d+e=12, d is an integer from 2 to 11 and e is an integer from 1 to 10;

when d+e=13, d is an integer from 2 to 12 and e is an integer from 1 to 11;

when d+e=14, d is an integer from 2 to 13 and e is an integer from 1 to 12.

In the mid-chain branched surfactant compounds described above, certain points of branching (e.g., the location along the chain of the R, $R^1$, and/or $R^2$ moieties in the above formula) are preferred over other points of branching along the backbone of the surfactant. The formula below illustrates the mid-chain branching range (i.e., where points of branching occur), preferred mid-chain branching range, and more preferred mid-chain branching range for mono-methyl branched alkyl $A^b$ moieties.

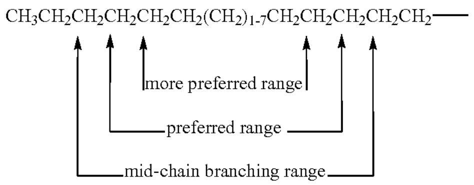

For mono-methyl substituted surfactants, these ranges exclude the two terminal carbon atoms of the chain and the carbon atom immediately adjacent to the —X—B group.

The formula below illustrates the mid-chain branching range, preferred mid-chain branching range, and more preferred mid-chain branching range for di-methyl substituted alkyl $A^b$ moieties.

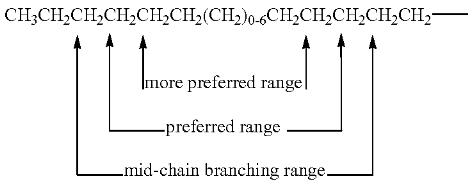

Additional suitable branched surfactants are disclosed in U.S. Pat. Nos. 6,008,181, 6,060,443, 6,020,303, 6,153,577, 6,093,856, 6,015,781, 6,133,222, 6,326,348, 6,482,789, 6,677,289, 6,903,059, 6,660,711, 6,335,312, and WO 9918929. Yet other suitable branched surfactants include those described in WO9738956, WO9738957, and WO0102451.

In some aspects, the branched anionic surfactant comprises a branched modified alkylbenzene sulfonate (MLAS), as discussed in WO 99/05243, WO 99/05242, WO 99/05244, WO 99/05082, WO 99/05084, WO 99/05241, WO 99/07656, WO 00/23549, and WO 00/23548.

In some aspects, the branched anionic surfactant comprises a C12/13 alcohol-based surfactant comprising a methyl branch randomly distributed along the hydrophobe chain, e.g., Safol®, Marlipal® available from Sasol.

Further suitable branched anionic detersive surfactants include surfactants derived from alcohols branched in the 2-alkyl position, such as those sold under the trade names Isalchem®123, Isalchem®125, Isalchem®145, Isalchem®167, which are derived from the oxo process. Due to the oxo process, the branching is situated in the 2-alkyl position. These 2-alkyl branched alcohols are typically in the range of C11 to C14/C15 in length and comprise structural isomers that are all branched in the 2-alkyl position. These branched alcohols and surfactants are described in US20110033413.

Other suitable branched surfactants include those disclosed in U.S. Pat. No. 6,037,313 (P&G), WO9521233 (P&G), U.S. Pat. No. 3,480,556 (Atlantic Richfield), U.S. Pat. No. 6,683,224 (Cognis), US20030225304A1 (Kao), US2004236158A1 (R&H), U.S. Pat. No. 6,818,700 (Atofina), US2004154640 (Smith et al), EP1280746 (Shell), EP1025839 (L'Oreal), U.S. Pat. No. 6,765,119 (BASF), EP1080084 (Dow), U.S. Pat. No. 6,723,867 (Cognis), EP1401792A1 (Shell), EP1401797A2 (Degussa AG), US2004048766 (Raths et al), U.S. Pat. No. 6,596,675 (L'Oreal), EP1136471 (Kao), EP961765 (Albemarle), U.S. Pat. No. 6,580,009 (BASF), US2003105352 (Dado et al), U.S. Pat. No. 6,573,345 (Cryovac), DE10155520 (BASF), U.S. Pat. No. 6,534,691 (du Pont), U.S. Pat. No. 6,407,279 (ExxonMobil), U.S. Pat. No. 5,831,134 (Peroxid-Chemie), U.S. Pat. No. 5,811,617 (Amoco), U.S. Pat. No. 5,463,143 (Shell), U.S. Pat. No. 5,304,675 (Mobil), U.S. Pat. No. 5,227,544 (BASF), U.S. Pat. No. 5,446,213A (MITSUBISHI KASEI CORPORATION), EP1230200A2 (BASF), EP1159237B1 (BASF), US20040006250A1 (NONE), EP1230200B1 (BASF), WO2004014826A1 (SHELL), U.S. Pat. No. 6,703,535B2 (CHEVRON), EP1140741B1

(BASF), WO2003095402A1 (OXENO), U.S. Pat. No. 6,765,106B2 (SHELL), US20040167355A1 (NONE), U.S. Pat. No. 6,700,027B1 (CHEVRON), US20040242946A1 (NONE), WO2005037751A2 (SHELL), WO2005037752A1 (SHELL), U.S. Pat. No. 6,906,230B1 (BASF), WO2005037747A2 (SHELL) OIL COMPANY.

Additional suitable branched anionic detersive surfactants include surfactant derivatives of isoprenoid-based polybranched detergent alcohols, as described in US 2010/0137649. Isoprenoid-based surfactants and isoprenoid derivatives are also described in the book entitled "Comprehensive Natural Products Chemistry: Isoprenoids Including Carotenoids and Steroids (Vol. two)", Barton and Nakanishi, © 1999, Elsevier Science Ltd and are included in the structure E, and are hereby incorporated by reference.

Further suitable branched anionic detersive surfactants include those derived from anteiso- and iso-alcohols. Such surfactants are disclosed in WO2012009525. Additional suitable branched anionic detersive surfactants include those described in US Patent Application Nos. 2011/0171155A1 and 2011/0166370A1.

Suitable branched anionic surfactants also include Guerbet-alcohol-based surfactants. Guerbet alcohols are branched, primary monofunctional alcohols that have two linear carbon chains with the branch point always at the second carbon position. Guerbet alcohols are chemically described as 2-alkyl-1-alkanols. Guerbet alcohols generally have from 12 carbon atoms to 36 carbon atoms. The Guerbet alcohols may be represented by the following formula: (R1)(R2)CHCH2OH, where R1 is a linear alkyl group, R2 is a linear alkyl group, the sum of the carbon atoms in R1 and R2 is 10 to 34, and both R1 and R2 are present. Guerbet alcohols are commercially available from Sasol as Isofol® alcohols and from Cognis as Guerbetol.

The surfactant system disclosed herein may comprise any of the branched surfactants described above individually or the surfactant system may comprise a mixture of the branched surfactants described above. Furthermore, each of the branched surfactants described above may include a bio-based content. In some aspects, the branched surfactant has a bio-based content of at least about 50%, at least about 60%, at least about 70%, at least about 80%, at least about 90%, at least about 95%, at least about 97%, or about 100%.

Organic Acid

The detergent compositions of the present invention comprise an organic acid. It is believed that organic acids help to provide buffering capacity to the composition, thereby inhibiting the autocatalytic hydrolysis of sulfated surfactants. The organic acid may be in the form of an organic carboxylic acid or polycarboxylic acid. The pKa of the organic acid (or, in the case of polyprotic organic acids, the lowest pKa) is generally greater than or equal to about 2.5 or greater than or equal to about 3. Examples of organic acids that may be used herein include: acetic, adipic, aspartic, carboxymethyloxymalonic, carboxymethyloxysuccinic, citric, formic, glutaric, glycolic, hydroxyethyliminodiacetic, iminodiacetic, itaconic, lactic, maleic, malic, malonic, oxydiacetic, oxydisuccinic, succinic, sulfamic, tartaric, tartaric-disuccinic, tartaric-monosuccinic, or mixtures thereof. Particularly suitable are acids that can also serve as detergent builders, such as citric acid. In some aspects, the organic acid is selected from the group consisting of citric acid, lactic acid, maleic acid, acetic acid, and mixtures thereof. In some aspects, the organic acid is a water-soluble or water-miscible organic acid.

In some aspects, the organic acid comprises fewer than 10 carbon atoms, or fewer than 7 carbon atoms, or fewer than 4 carbon atoms, or fewer than 2 carbon atoms. The organic acid may have a molecular weight of about 210 or less.

The detergent compositions of the present disclosure contain from about 0.1% to about 25%, or from about 0.2% to about 20%, or from about 0.3% to about 15%, by weight of the composition, of the organic acid. In some aspects, the detergent compositions comprise from about 1% to about 12%, alternatively from about 5% to about 10% or to about 12% or to about 15%, by weight of the composition, of the organic acid.

Alkoxylated Polyamine Compounds

The detergent compositions of the present invention comprise alkoxylated polyamine compounds. Alkoxylated polyamine compounds (or simply "polyamines," as used herein) are known to deliver cleaning and/or whitening benefits, for example soil anti-redeposition benefits. However, it has surprisingly been discovered that alkoxylated polyamine compounds may also operate synergistically with sulfated surfactants at acidic pHs to provide surfactant stability benefits. It is believed that the polyamines inhibit the rate of sulfated surfactant hydrolysis in low pH systems by interrupting $H^+$ access to the interfaces and/or by interrupting interaction between the sulfated surfactants. Additionally, some polyamines may provide suds collapsing benefits. As used herein, "polyamine" is not meant to include polypeptides or proteins, such as enzymes.

The polyamines of the present disclosure are suitable for use in liquid and gel laundry detergent compositions, including heavy duty liquid (HDL) laundry compositions. The detergent compositions of the present disclosure may comprise from about 0.01%, or from about 0.05%, or from about 0.1%, or from about 0.5%, or from about 0.8%, or from about 1.0%, or from about 1.5%, to about 2%, or to about 2.5%, or to about 3%, or to about 5%, or to about 10%, or to about 15%, or to about 20%, by weight of the composition of alkoxylated polyamines. In some aspects, the detergent compositions may comprise from about 0.1% to about 2%, or from about 0.2% to about 1.5%, or from about 0.4% to about 1.2%, or from about 0.5% to about 1%, by weight of the composition of alkoxylated polyamines. The detergent compositions may comprise mixtures of alkoxylated polyamine compounds.

The alkoxylated polyamine compound may have a weight average molecular weight of from about 200 to about 60,000, or to about 20,000, or to about 10,000. In some aspects, the weight average molecular weight is from about 350 to about 5000, or to about 2000, or to about 1000.

The alkoxylated polyamine compound comprises one or more alkoxylated amine groups. As used herein, "alkoxylated amine groups" includes alkoxylated amine, imine, amide, and/or imide groups, unless otherwise indicated. The alkoxylated polyamine groups typically comprise at least two, or at least four, or at least seven, or at least ten, or at least sixteen alkoxylated amine groups.

Each alkoxylated amine group may independently have one or more alkoxylates. When a alkoxylated amine group has more than one alkoxylate, a chain of alkoxylates is formed. Each alkoxylated amine group may independently have at least about five, or at least about eight, or at least about twelve alkoxylates, and each alkoxylated amine group may independently have up to about eighty, or up to about fifty, or up to about twenty-five alkoxylates. The alkoxylates may be independently selected from ethoxylate (EO) groups, propoxylate (PO) groups, or mixtures thereof.

Typically, the alkoxylated polyamine compounds are polymers. A polymer is a compound having two or more repeating monomer units forming a backbone. The alkoxylated polyamines of the present invention are typically such that the alkoxylate chains are not part of the backbone of the polymer, but are alkoxylate chains of the amine, imine, amide, or imide groups in the units forming the backbone, or are alkoxylate chains of other side-groups chemically bound to the backbone.

The alkoxylated polyamine compound is typically a polyamide, a polyimide, a polyamine, or polyimine, or combinations thereof, or more typically a polyamine or a polyimine compound, whereby the amide, imide, amine, or imine units are present as backbone of the polymer, forming the chain of repeating units. Typically, these polyamines have at least two or at least three or at least four or at least five amide, imide, amine, or imine units. It may be that only some of the amines, imines, amides, or imides are alkoxylated. The backbone may also have side-chains containing amide, imide, amine, or imine groups, which may be alkoxylated.

In some aspects, the polyamine comprises a polyalkylamine backbone. The polyalkylamine may comprise C2 alkyl groups, C3 alkyl groups, or mixtures thereof. In some aspects, the polyamine has a polyethyleneimine (PEI) backbone. In some aspects, the PEI backbone has a weight average molecular weight of from about 200 to about 1500, or of about 400 to about 1000, or of about 500 to about 800, or of about 600. The PEI backbones of the polyamines described herein, prior to alkoxylation, may have the general empirical formula:

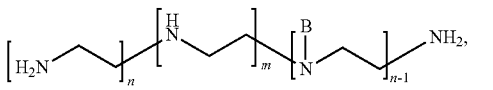

where B represents a continuation of this structure by branching. In some aspects, n+m is equal to or greater than 8, or 10, or 12, or 14, or 18, or 22.

Suitable polyamines include low molecular weight, water soluble, and lightly alkoxylated ethoxylated/propoxylated polyalkyleneamine polymers, such as those described in U.S. Pat. No. 5,565,145, incorporated herein by reference. By "lightly alkoxylated," it is meant the polymers of this invention average from about 0.5 to about 20, or from 0.5 to about 10, alkoxylations per nitrogen. The polyamines may be "substantially noncharged," meaning that there are no more than about 2 positive charges for every about 40 nitrogens present in the backbone of the polyalkyleneamine polymer at pH 10, or at pH 7; it is recognized, however, that the charge density of the polymers may vary with pH.

The alkoxylated polyamines may be ethoxylated polyalkyleneamines, ethoxylated polyalkyleneimines, or mixtures thereof. The alkyl group of the polyalkyleneamine or polyalkyleneimine may be a C2 group, a C3 group, or mixtures thereof. Suitable polyamines include ethoxylated polyethyleneamines (PEAs) and ethoxylated polyethyleneimines (PEIs). In the polyalkyleneimines and polyalkyleneamines, each hydrogen atom attached to each nitrogen atom represents an active site for possible subsequent ethoxylation. The PEIs used in preparing some suitable compounds can have a weight average molecular weight of at least about 600 prior to ethoxylation, which represents at least about 14 ethyleneimine units. The polyamine may be an ethoxylated polyethyleneimine, typically having an average ethoxylation degree per ethoxylation chain of from about 15 to about 25, and further having a weight average molecular weight of from about 1000 to about 2000; examples include PEI 600 E20 and PEI 182 E15. The polyamine may also be an ethoxylated tetraethylene pentaimine. In some aspects, the molecular average molecular weight of the ethoxylated PEAs and/or the ethoxylated PEIs is from about 8000 g/mol to about 25,000 g/mol, or from about 10,000 g/mol to about 20,000 g/mol, or from about 12,000 g/mol to about 15,000 g/mol, or about 14,000 g/mol.

The alkoxylated polyamine compounds may be ethoxylated polyamine compounds of the following structures:

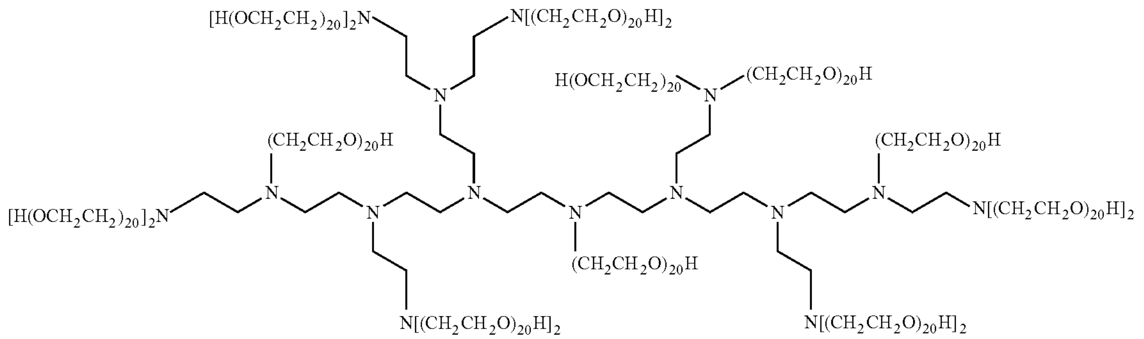

and/or

-continued

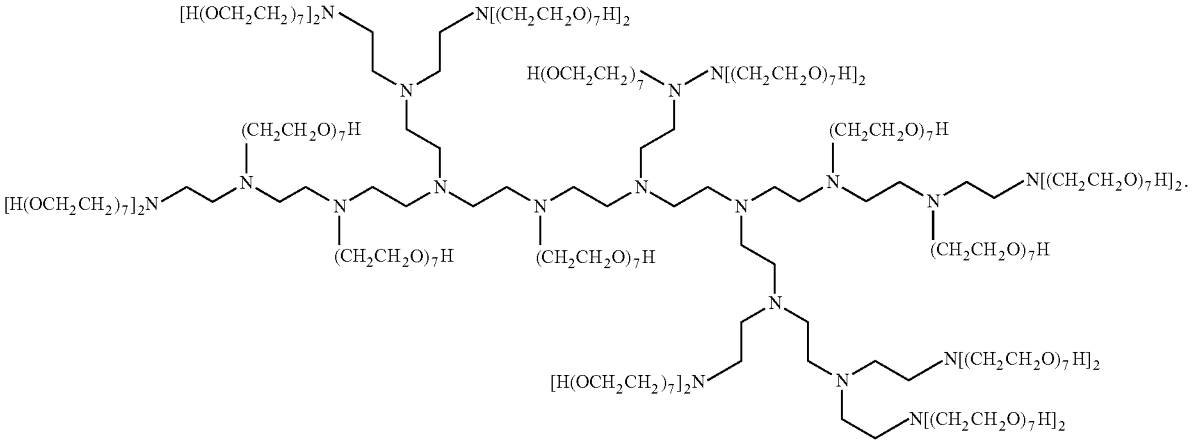

Other alkoxylated polyamine compounds include amphiphilic water-soluble alkoxylated polyalkylenimine polymers, such as those described in U.S. Pat. No. 8,097,579, incorporated herein by reference. The alkoxylated polyalkylenimine polymers of this type comprise, in condensed form, repeating units of formulae (I), (II), (III) and (IV)

$E_2N—A^1—\#$ (I)

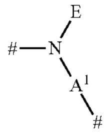

(II)

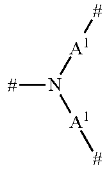

(III)

$\#—NE_2$ (IV)

where # in each case denotes one-half of a bond between a nitrogen atom and the free binding position of a group $A^1$ of two adjacent repeating units of formulae (I), (II), (III) or (IV); $A^1$ is independently selected from linear or branched $C_2$-$C_6$-alkylene; E is independently selected from alkylenoxy units of the formula (V)

$$*-[A^2-O]_m-[CH_2-CH_2-O]_n-[A^3-O]_p-R \quad (V)$$

where * in each case denotes one-half of a bond to the nitrogen atom of the repeating unit of formula (I), (II) or (IV); $A^2$ is in each case independently selected from 1,2-propylene, 1,2-butylene and 1,2-isobutylene; $A^3$ is 1,2-propylene; R is in each case independently selected from hydrogen and $C_1$-$C_4$-alkyl; m has an average value in the range of from 0 to about 2; n has an average value in the range of from about 20 to about 50; and p has an average value in the range of from about 10 to about 50; where the individual alkoxylated polyalkylenimines consisting of 1 repeating unit of formula (I), x repeating units of formula (II), y repeating units of formula (III) and y+1 repeating units of formula (IV), where x and y in each case have a value in the range of from 0 to about 150; and the polymer having a backbone comprising the combined repeating units of formulae (I), (II), (III) and (IV) excluding the alkylenoxy units E, where the average molecular weight, Mw, of the polyalkylenimine backbone in each case having a value in the range of from about 60 g/mol to about 10,000 g/mol, or from about 100 g/mol to about 8,000 g/mol, or from about 500 g/mol to about 6,000 g/mol; and the polymer comprises a degree of quaternization ranging from 0 to about 50.

Suitable alkoxylated polyamine compounds include alkoxylated polyalkylenimine polymers are that are propoxylated polyamines. In some aspects, the propoxylated polyamines are also ethoxylated. In some aspects, the propoxylated polyamines have inner polyethylene oxide blocks and outer polypropylene oxide blocks, the degree of ethoxylation and the degree of propoxylation not going above or below specific limiting values. In some aspects, the propoxylated polyalkylenimines according to the present invention have a minimum ratio of polyethylene blocks to polypropylene blocks (n/p) of about 0.6 and a maximum of about $1.5(x+2y+1)^{1/2}$. Propoxylated polyalkyenimines having an n/p ratio of from about 0.8 to about $1.2(x+2y+1)^{1/2}$ have been found to have especially beneficial properties. In some aspects, the ratio of polyethylene blocks to polypropylene blocks (n/p) is from about 0.6 to a maximum of about 10, or a maximum of about 5, or a maximum of about 3. The n/p ratio may be about 2. In some aspects, the propoxylated polyalkylenimines have PEI backbones having molecular weights of from about 200 g/mol to about 1200 g/mol, or from about 400 g/mol to about 800 g/mol, or about 600 g/mol. In some aspects, the molecular weight of the propoxylated polyalkylenimine is from about 8,000 to about 20,000 g/mol, or from about 10,000 to about 15,000 g/mol, or about 12,000 g/mol.

Suitable propoxylated polyamine compounds are of the following structure:

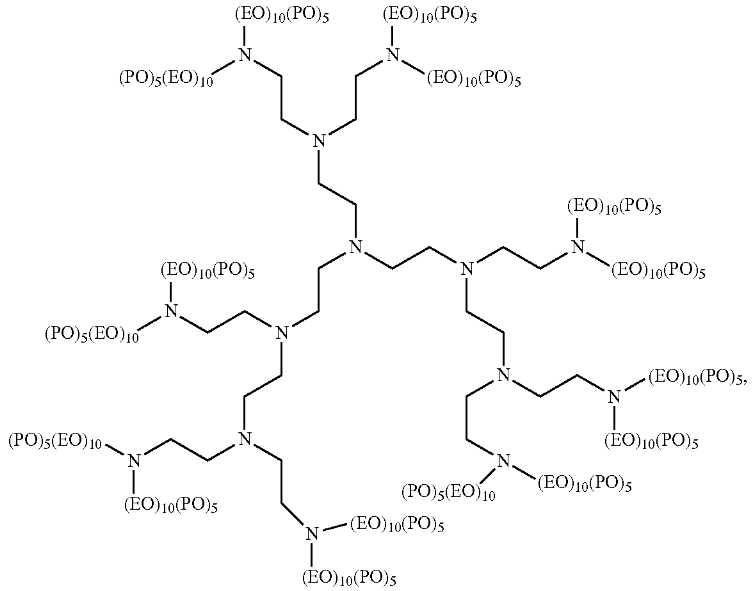

where EOs are ethoxylate groups and POs are propoxylate groups.

Other suitable alkoxylated polyamine compounds include zwitterionic polyamines, such as those described in U.S. Pat. No. 6,525,012, incorporated herein by reference. At least two of the nitrogens of the polyamine backbones may be quaternized.

For the purposes of the present invention, "cationic units" are defined as "units which are capable of having a positive charge". For the purposes of the zwitterionic polyamines of the present invention, the cationic units are the quaternary ammonium nitrogens of the polyamine backbones. For the purposes of the present invention, "anionic units" are defined as "units which are capable of having a negative charge". For the purposes of the zwitterionic polyamines of the present invention, the anionic units are "units which alone, or as a part of another unit, substitute for hydrogen atoms of the backbone nitrogens along the polyamine backbone," a non-limiting example of which is a $—(CH_2CH_2O)_{20}SO_3Na$ which is capable of replacing a backbone hydrogen on a nitrogen atom.

For the purposes of the present invention the term "charge ratio", $Q_r$, is defined herein as "the quotient derived from dividing the sum of the number of anionic units present excluding counter ions by the sum of the number of quaternary ammonium backbone units". The charge ratio is defined by the expression:

$$Q_r = \frac{\sum q_{anionic}}{\sum q_{cationic}}$$

where $q_{anionic}$ is an anionic unit, inter alia, $—SO_3M$, as defined herein below and $q_{cationic}$ represents a quaternized backbone nitrogen.

Those of skill in the art will realize that the greater the number of amine units which comprise the polyamine backbones of the present invention, the greater the number of potential cationic units will be contained therein. For the purposes of the present invention the term "degree of quaternization" is defined herein as "the number of backbone units which are quaternized divided by the number of backbone units which comprise the polyamine backbone". The degree of quaternization, Q(+), is defined by the expression:

$$Q(+) = \frac{\sum \text{quaternized backbone nitrogens}}{\sum \text{quaternizable backbone nitrogens}}$$

where a polyamine having all of the quaternizable backbone nitrogens quaternized will have a Q(+) equal to 1. For the purposes of the present invention the term "quaternizable nitrogen" refers to nitrogen atoms in the polyamine backbone which are capable of forming quaternary ammonium ions. This excludes nitrogens not capable of ammonium ion formation, such as amides.

For the purposes of the present invention the term "anionic character", AQ, is defined herein as "the sum of the number of anionic units which comprise the zwitterionic polymer minus the number of quaternary ammonium backbone units". The greater the excess number of anionic units, the greater the anionic character of the zwitterionic polymer. It will be recognized by the formulator that some anionic units may have more than one unit which has a negative charge. For the purposes of the present invention units having more than one negatively charged moiety, such as $—CH_2CH(SO_3M)CH_2SO_3M$, will have each moiety capable of having a negative charge counted toward the sum of anionic units. The anionic character is defined by the expression:

$$\Delta Q = \Sigma q_{anionic} - \Sigma q_{cationic}$$

where $q_{anionic}$ and $q_{cationic}$ are the same as defined herein above.

The zwitterionic polyamines of the present invention have the formula:

$$[J\text{-}R]_n\text{-}J$$

where the [J-R] units represent the amino units which comprise the main backbone and any branching chains. The zwitterionic polyamines prior to modification, for example, quatemization and/or substitution of a backbone unit hydrogen with an alkyleneoxy unit, may have backbones that comprise from 2 to about 100 amino units. The index n which describes the number of backbone units present is further described herein below.

J units are the backbone amino units, said units are selected from the group consisting of:

i) primary amino units having the formula:

$(R^1)_2N$;

ii) secondary amino units having the formula:

$—R^1N$;

iii) tertiary amino units having the formula:

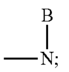

iv) primary quaternary amino units having the formula:

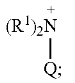

v) secondary quaternary amino units having the formula:

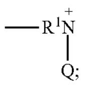

vi) tertiary quaternary amino units having the formula:

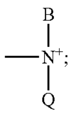

vii) primary N-oxide amino units having the formula:

viii) secondary N-oxide amino units having the formula:

ix) tertiary N-oxide amino units having the formula:

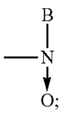

x) and mixtures thereof.

B units which have the formula:

[J-R]— represent a continuation of the zwitterionic polyamine backbone by branching. The number of B units present, as well as, any further amino units which comprise the branches are reflected in the total value of the index n.

The backbone amino units of the zwitterionic polymers are connected by one or more R units, said R units are selected from the group consisting of:

i) $C_2$-$C_{12}$ linear alkylene, $C_3$-$C_{12}$ branched alkylene, or mixtures thereof, more typically $C_3$-$C_6$ alkylene. When two adjacent nitrogens of the polyamine backbone are N-oxides, typically the alkylene backbone unit which separates said units are $C_4$ units or greater.

ii) alkyleneoxyalkylene units having the formula:

$—(R^2O)_w(R^3)—$ where $R^2$ is selected from the group consisting of ethylene, 1,2-propylene, 1,3-propylene, 1,2-butylene, 1,4-butylene, and mixtures thereof; $R^3$ is $C_2$-$C_8$ linear alkylene, $C_3$-$C_8$ branched alkylene, phenylene, substituted phenylene, and mixtures thereof; the index w is from 0 to about 25. $R^2$ and $R^3$ units may also comprise other backbone units. When comprising alkyleneoxyalkylene units $R^2$ and $R^3$ units may be mixtures of ethylene, propylene and butylene and the index w is from 1, or from about 2, to about 10, or to about 6.

iii) hydroxyalkylene units having the formula:

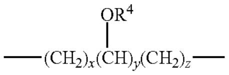

where $R^4$ is hydrogen, $C_1$-$C_4$ alkyl, $—(R^2O)_tY$, and mixtures thereof. When R units comprise hydroxyalkylene units, $R^4$ may be hydrogen or $—(R^2O)_tY$ where the index t is greater than 0, or from about 10 to about 30, and Y is hydrogen or an anionic unit, for example $—SO_3M$. The indices x, y, and z are each independently from 1 to 6; the indices may be each equal to 1 and $R^4$ is hydrogen (2-hydroxypropylene unit) or $(R^2O)_tY$, or for polyhydroxy units y is preferably 2 or 3. A suitable hydroxyalkylene unit is the 2-hydroxypropylene unit which can, for example, be suitably formed from glycidyl ether forming reagents, for example, epihalohydrin.

iv) hydroxyalkylene/oxyalkylene units having the formula:

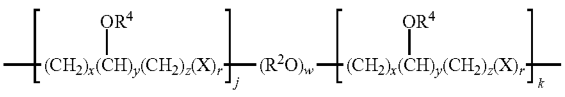

where $R^2$, $R^4$, and the indices w, x, y, and z are the same as defined herein above. X is oxygen or the amino unit —$NR^4$—, the index r is 0 or 1. The indices j and k are each independently from 1 to 20. When alkyleneoxy units are absent the index w is 0. Non-limiting examples of preferred hydroxyalkylene/oxyalkylene units have the formula:

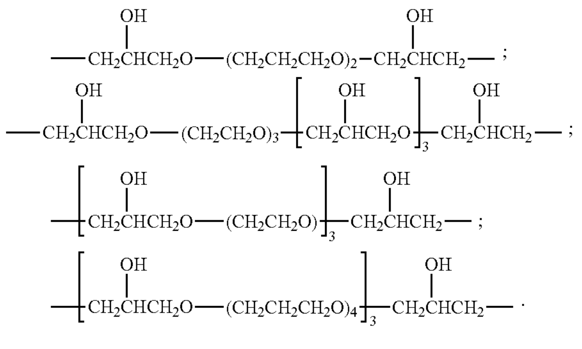

v) carboxyalkyleneoxy units having the formula:

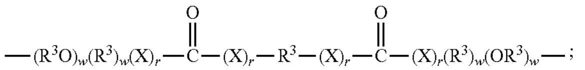

where $R^2$, $R^3$, X, r, and w are the same as defined herein above. Non-limiting examples of preferred carboxyalkyleneoxy units include:

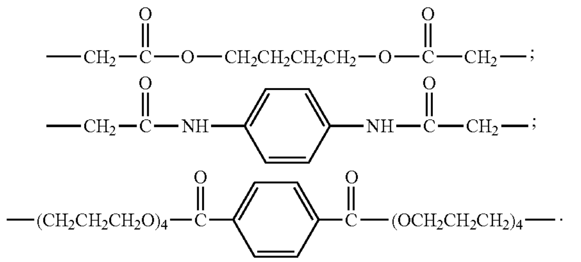

vi) backbone branching units having the formula:

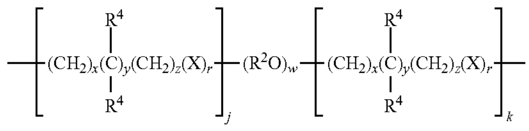

where $R^4$ is hydrogen, $C_1$-$C_6$ alkyl, —$(CH_2)_u(R^2O)_t(CH_2)_uY$, and mixtures thereof. When R units comprise backbone branching units, $R^4$ may be hydrogen or —$(CH_2)_u(R^2O)_t$—$(CH_2)_uY$ where the index t is greater than 0, or is from about 10 to about 30; the index u is from 0 to 6; and Y is hydrogen, $C_1$-$C_4$ linear alkyl, —$N(R^1)_2$, an anionic unit, and mixtures thereof; Y may be hydrogen, or —$N(R^1)_2$. A preferred aspect of backbone branching units comprises $R^4$ equal to —$(R^2O)_tH$. The indices x, y, and z are each independently from 0 to 6.

vii) The formulator may suitably combine any of the above described R units to make a zwitterionic polyamine having a greater or lesser degree of hydrophilic character.

$R^1$ units are the units which are attached to the backbone nitrogens. $R^1$ units are selected from the group consisting of:

i) hydrogen; which is the unit typically present prior to any backbone modification.

ii) $C_1$-$C_{22}$ alkyl, or $C_1$-$C_4$ alkyl, or methyl or ethyl, or methyl. When $R^1$ units are attached to quaternary units (iv) or (v), $R^1$ may be the same unit as quaternizing unit Q. For example, a J unit having the formula:

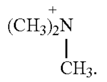

iii) $C_7$-$C_{22}$ arylalkyl, or benzyl.

iv) —$[CH_2CH(OR^4)CH_2O]_s(R^2O)_tY$; where $R^2$ and $R^4$ are the same as defined herein above; in some aspects, when $R^1$ units comprise $R^2$ units, $R^2$ may be ethylene. The value of the index s is from 0 to 5. For the purposes of the present invention the index t is expressed as an average value, said average value from about 0.5 to about 100. The formulator may lightly alkyleneoxylate the backbone nitrogens in a manner where not every nitrogen atom comprises an $R^1$ unit which is an alkyleneoxy unit thereby rendering the value of the index t less than 1.

v) Anionic units as described herein below.

vi) The formulator may suitably combine one or more of the above described $R^1$ units when substituting the backbone of the zwitterionic polymers of the present invention.

Q may be a quaternizing unit selected from the group consisting of $C_1$-$C_4$ linear alkyl, benzyl, and mixtures thereof; in some aspects, Q is methyl. As described herein above, Q may be the same as $R^1$ when $R^1$ comprises an alkyl unit. For each backbone $N^+$ unit (quaternary nitrogen) there will be an anion to provide charge neutrality. The anionic groups of the present invention include both units which are covalently attached to the polymer, as well as, external anions which are present to achieve charge neutrality. Non-limiting examples of anions suitable for use include halogen, for example, chloride; methyl sulfate; hydrogen sulfate; and sulfate. The formulator will recognize by the herein described examples that the anion will typically be a unit that is part of the quaternizing reagent, for example, methyl chloride, dimethyl sulfate, and/or benzyl bromide.

X is oxygen, —$NR^4$—, or mixtures thereof; in some aspects, X is oxygen.

Y is hydrogen, or an anionic unit. Anionic units are defined herein as "units or moieties which are capable of having a negative charge". For example, a carboxylic acid unit, —$CO_2H$, is neutral, however upon de-protonation the unit becomes an anionic unit, —$CO_2$, the unit is therefore, "capable of having a negative charge. Non-limiting examples of anionic Y units include —$(CH_2)_fCO_2M$, —$C(O)(CH_2)_fCO_2M$, —$(CH_2)_fPO_3M$, —$(CH_2)_fOPO_3M$, —$(CH_2)_fSO_3M$, —$(CH_2)_fOSO_3M$, —$CH_2(CHSO_3M)(CH_2)_f SO_3M$, —$CH_2(CHSO_2M)(CH_2)_fOSO_3M$, —$CH_2(CHOSO_3M)(CH_2)_fOSO_3M$, —$CH_2(CHSO_2M)(CH_2)_fSO_3M$, —$C(O)CH_2CH(SO_3M)$, —$CO_2M$, —$C(O)CH_2CH(CO_2M)NHCH(CO_2M)CH_2CO_2M$, —$C(O)CH_2CH(CO_2M)NHCH_2CO_2M$, —$CH_2CH(OZ)CH_2O(R^1O)Z$, —$(CH_2)_fCH[O(R^2O)_2]$—$CH_fO(R^2O)_tZ$, and mixtures thereof, where Z is hydrogen or an anionic unit non-limiting examples of which include —$(CH_2)_fCO_2M$, —$C(O)(CH_2)_fCO_2M$, —$(CH_2)_fPO_3M$, —$(CH_2)_fOPO_3M$, —$(CH_2)_fSO_3M$, —$CH_2$ $(CHSO_3M)(CH_2)_fSO_3M$, $—CH_2(CHSO_2M)(CH_2)_fSO_3M$, $—C(O)CH_2CH(SO_3M)CO_2M$, $—(CH_2)_fOSO_3M$, $—CH_2(CHOSO_3M)(CH_2)_fOSO_3M$, $—CH_2(CHOSO_2M)(CH_2)_fOSO_3M$, $—C(O)CH_2CH(CO_2M)NHCH(CO_2M)CH_2CO_2M$, and mixtures thereof, M is a cation which provides charge neutrality.

Y units may also be oligomeric or polymeric, for example, the anionic Y unit having the formula:

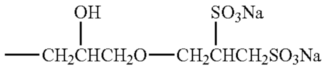

may be oligomerized or polymerized to form units having the general formula:

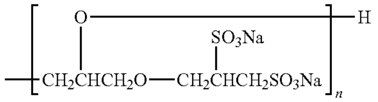

where the index n represents a number greater than 1.

Further non-limiting examples of Y units which can be suitably oligomerized or polymerized include:

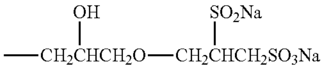

and

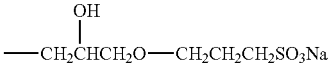

and

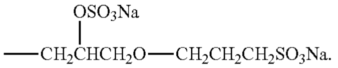

As described herein above that a variety of factors, such as the overall polymer structure, the nature of the formulation, the wash conditions, and the intended target cleaning benefit, all can influence the formulator's optimal values for $Q_r$, $\Delta Q$, and Q(+). For liquid laundry detergent compositions, it may be that less than about 90%, or less than 75%, or less than 50%, or less than 40% of said Y units comprise an anionic moiety, for example, $—SO_3M$ comprising units. The number of Y units which comprise an anionic unit may vary from aspect to aspect. M is hydrogen, a water soluble cation, or mixtures thereof; the index f is from 0 to 6.

The index n represents the number of backbone units where the number of amino units in the backbone is equal to n+1. For the purposes of the present invention the index n is from 1 to about 99. Branching units B are included in the total number of backbone units. For example, a backbone having the formula:

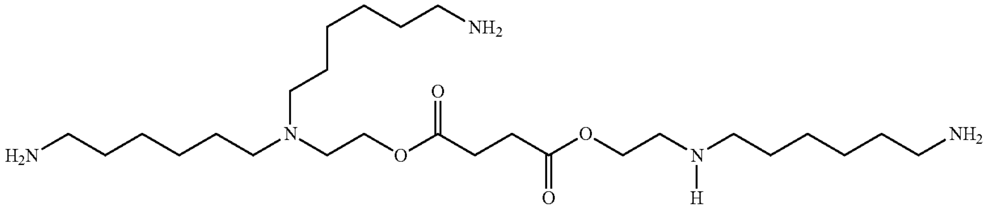 [SMILES: NCCCCCCNCCOC(=O)CCC(=O)OCCN(CCCCCCN)CCCCCCN]

has an index n equal to 4. The following is a non-limiting example of a polyamine backbone which is fully quaternized.

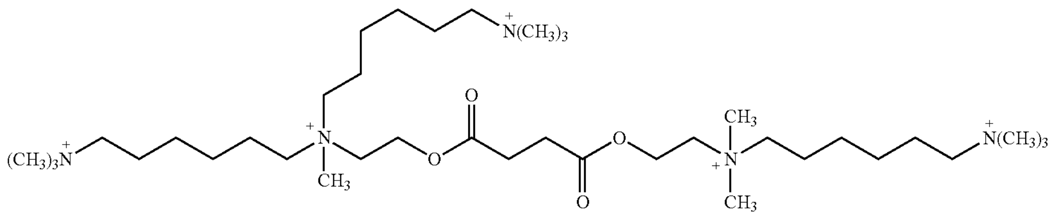

The following is a non-limiting example of a zwitterionic polyamine according to the present invention.

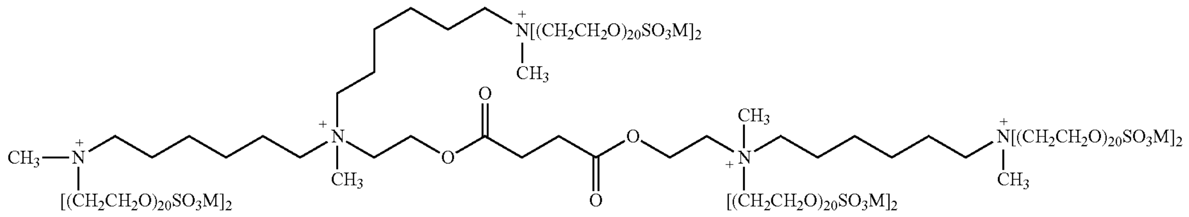

Suitable zwitterionic polymers of the present invention may have the formula:

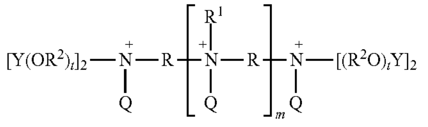

where R units have the formula —$(R^2O)_wR^3$— where $R^2$ and $R^3$ are each independently selected from the group consisting of $C_2$-$C_8$ linear alkylene, $C_3$-$C_8$ branched alkylene, phenylene, substituted phenylene, and mixtures thereof. The $R^2$ units of the formula above, which comprise —$(R^2O)_tY$ units, are each ethylene; Y is hydrogen, —$SO_3M$, or mixtures thereof; the index t is from 15 to 25; the index m is from 0 to about 20, or from 0 to about 10, or from 0 to about 4, or from 0 to about 3, or from 0 to 2; the index w is from 1, or from about 2, to about 10, or to about 6.

Suitable zwitterionic polymers of the present invention may comprise polyamine backbones that are derivatives of two types of backbone units:

i) normal oligomers which comprise R units of type (i), which may be polyamines having the formula:

$$[H_2N—(CH_2)_x]_{n+1}—[NH—(CH_2)_x]_m—(NB—(CH_2)_x]_n—NH_2$$

where B is a continuation of the polyamine chain by branching; n may be 0; m is from 0 to 3; x is 2 to 8, or from 3 to 6; and ii) hydrophilic oligomers which comprise R units of type (ii), which may be polyamines having the formula:

$$H_2N—[(CH_2)_xO]_y(CH_2)_x]—[NH—[(CH_2)_xO]_y(CH_2)_x]_m—NH_2$$

where m is from 0 to 3; each x is independently from 2 to 8, or from 2 to 6; y may be from 1 to 8.

Suitable backbone units are the units from (i). Further suitable aspects are polyamines which comprise units from (i) which are combined with R units of types (iii), (iv), and (v), an non-limiting example of which includes the epihalohydrin condensate having the formula:

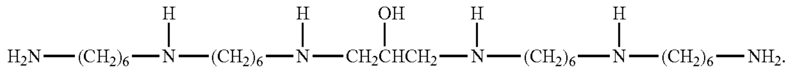

As described herein before, the formulator may form zwitterionic polymers which have an excess of charge or an equivalent amount of charge type. An example of a suitable zwitterionic polyamine according to the present invention having an excess of backbone quaternized units has the formula:

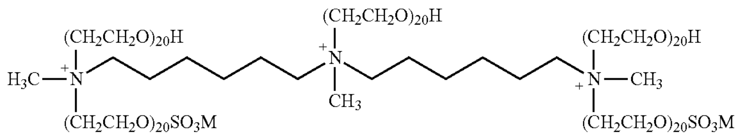

where R is a 1,5-hexamethylene; w is 2; $R^1$ is —$(R^2O)_tY$; where $R^2$ is ethylene; Y is hydrogen or —$SO_3M$; Q is methyl; m is 1; and t is 20. For zwitterionic polyamines of the present invention, it will be recognized by the formulator that not every $R^1$ unit will have a —$SO_3$ moiety capping said $R^1$ unit. For the above example, the final zwitterionic polyamine mixture comprises at least about 40% Y units which are —$SO_3^-$ units.

Other suitable zwitterionic alkoxylated polyamines include ethoxylated hexamethyldiamine compounds, such as hexamethylenediamine dimethyquat with an average degree of ethoxylation=24, and hexamethylenediamine dimethyquat with an average degree of ethoxylation=24 (disulfonated). The ethoxylated hexamethyldiamine may have the following formula:

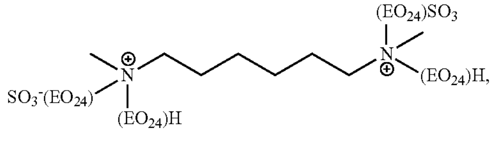

where EO represents an ethoxylate group.

pH

The compositions of the present disclosure are acidic and have a pH less than about 7, when measured in a neat solution of the composition at 20±2° C. In some aspects, the pH of the composition is from about 2 to about 6.9, or from about 2 to about 6, or from about 2 to about 5, or from about 2.1 to about 4, or about 2.5. In some aspects, an alkalizing agent is added to the composition in order to obtain the desirable neat pH of the composition. Suitable alkalizing agents include hydroxides of alkali metals or alkali earth metals, such as sodium hydroxide, or alkanolamines, such as methanolamine (MEA) or triethanolamine (TEA) or mixtures thereof. In some aspects, the composition from about 0.25%, or from about 0.0.3%, or from about 0.35%, or from about 0.4% to about 10%, or to about 5% or to about 2%, or to about 1%, by weight of the composition, of an alkalizing agent, preferably of an alkanolamine. An alkalizing agent that provides buffering capacity to the composition may be particularly useful in helping to stabilize the sulfated surfactant. However, even when the composition comprises an alkalizing agent, an acidic pH must be maintained in the final product.

Unless otherwise stated herein, the pH of the composition is defined as the neat pH of the composition at 20±2° C. Any meter capable of measuring pH to ±0.01 pH units is suitable. Orion meters (Thermo Scientific, Clintinpark-Keppekouter, Ninovesteenweg 198, 9320 Erembodegem-Aalst, Belgium) or equivalent are acceptable instruments. The pH meter should be equipped with a suitable glass electrode with calomel or silver/silver chloride reference. An example includes Mettler DB 115. The electrode should be stored in the manufacturer's recommended electrolyte solution. The pH is measured according to the standard procedure of the pH meter manufacturer. Furthermore, the manufacturer's instructions to set up and calibrate the pH assembly should be followed.

In some aspects, the detergent compositions of the present invention have a reserve acidity to pH 7.00 of at least about 1, or at least about 3, or at least about 5. In some aspects, the compositions herein have a reserve acidity to pH 7.00 of from about 3 to about 10, or from about 4 to about 7. As used herein, "reserve acidity" refers to the grams of NaOH per 100 g of product required to attain a pH of 7.00. The reserve acidity measurement as used herein is based upon titration (at standard temperature and pressure) of a 1% product solution in distilled water to an end point of pH 7.00, using standardized NaOH solution. Without being limited by theory, the reserve acidity measurement is found to be the best measure of the acidifying power of a composition, or the ability of a composition to provide a target acidic wash pH when added at high dilution into tap water as opposed to pure or distilled water. The reserve acidity is controlled by the level of formulated organic acid along with the neat product pH as well as, in some aspects, other buffers, such as alkalizing agents, for example, alkanolamines.

Free of Bleach

Bleach can present formulation challenges in liquid detergent compositions. Therefore, in some aspects, the compositions are substantially free of bleach, or of peroxide bleach. In other aspects, the detergent compositions comprise from about 0% to about 0.01%, by weight of the composition, peroxide bleach.

The term peroxide bleach may include hydrogen peroxide, sources of peroxide, or a mixture thereof. As used herein, a source of peroxide refers to a compound or system that produces and/or generates peroxide ions in solution. Sources of peroxide include percarbonates, persilicate, persulphate such as monopersulfate, perborates (including any hydrate thereof, including the mono- or tetra-hydrate), peroxyacids such as diperoxydodecanedioic acid (DPDA), magnesium perphthalic acid, dialkylperoxides, diacylperoxides, preformed percarboxylic acids (including monopercarboxylic acids), perbenzoic and alkylperbenioic acids, organic and inorganic peroxides and/or hydroperoxides or mixtures thereof. Additionally, hydrogen peroxide sources are described in detail in the herein incorporated Kirk Othmer's Encyclopedia of Chemical Technology, 4th Ed (1992, John Wiley & Sons), Vol. 4, pp. 271-300 "Bleaching Agents (Survey)", and include the various forms of sodium perborate and sodium percarbonate, including various coated and modified forms.

In some aspects, the composition is substantially free of, or contains less than 0.1%, non-peroxide bleach. Examples of non-peroxide bleach include hypohalite bleaches and sources thereof. Non-limiting examples of hypohalite bleaches or sources thereof include a simple hypochlorite salt, such as those of the alkali or alkaline earth metals, or a compound which produces hypochlorite on hydrolysis, such as organic N-chloro compounds. Other hypohalites may include hypobromite, which may be conveniently provided in situ from a bromide salt and a suitable strong oxidant such as hypochlorite.

Organic Solvent

In some aspects, the compositions comprise organic solvent. The compositions may comprise from about 0.05% to about 25%, or from about 0.1% to about 15%, or from about 1% to about 10%, or from about 2% to about 5%, by weight of the composition organic solvent. The composition may comprise less than about 5%, or less than about 1%, organic solvent. In other aspects, the compositions are substantially free of organic solvent.

The organic solvent, if present, may be selected from 1,2-propanediol, methanol, ethanol, glycerol, dipropylene glycol, diethylene glycol (DEG), methyl propanediol, or mixtures thereof. Other lower alcohols, such C1-C4 alkanolamines, e.g., monoethanolamine and/or triethanolamine, may also be used. In some aspects, the organic solvent comprises propanediol.

Adjuncts

The compositions of the present invention may comprise one or more laundry adjuncts, such as builders, dyes, chelants, enzymes, stabilizers, radical scavengers, perfumes, fluorescent whitening agents, suds-supressors, soil-suspension polymers, soil release polymers, dye-transfer inhibitors, fabric softening additives, rheology modifiers, structurants, halide salt, and/or other benefit agents. In some aspects, the compositions comprise from about 0.01% to about 50% of a laundry adjunct. In addition to the disclosure below, further description of suitable adjuncts can be found in US Patent Application 20130072415A1, incorporated herein by reference.

Builders

The detergent compositions may comprise a builder. Suitable builders herein can be selected from the group consisting of phosphates and polyphosphates, especially the sodium salts; aluminosilicates and silicates; carbonates, bicarbonates, sesquicarbonates and carbonate minerals other than sodium carbonate or sesquicarbonate; organic mono-, di-, tri-, and tetracarboxylates especially water-soluble nonsurfactant carboxylates in acid, sodium, potassium or alkanolammonium salt form, as well as oligomeric or water-soluble low molecular weight polymer carboxylates including aliphatic and aromatic types; and phytic acid. These may be complemented by borates, e.g., for pH-buffering purposes, or by sulfates, especially sodium sulfate and any other fillers or carriers which may be important to the engineering of stable surfactant and/or builder-containing detergent compositions.

Dyes

The detergent compositions of the present disclosure may comprise a dye to either provide a particular color to the composition itself (non-fabric substantive dyes) or to provide a hue to the fabric (hueing dyes). In one aspect, the compositions of the present disclosure may contain from about 0.0001% to about 0.01% of a non-fabric substantive dye and/or a hueing dye. Examples of suitable hueing dyes include Basic Violet 3 (CI 42555) and Basic Violet 4 (CI 42600), both commercially available from Standard Dyes, and Liquitint Violet 200 from Milliken Company. Suitable dyes may are also described in WO 2011/011799, WO 08/87497A1, WO 2011/98355, WO 2008/090091, U.S. Pat. Nos. 8,138,222, 7,686,892B2, 7,909,890B2, US 2012/129752A1, and US 2012/0101018A1, each of which is incorporated herein by reference.

Chelants

The compositions of the present disclosure may comprise a chelant. Chelants useful herein include DTPA, HEDP, DTPMP, dipicolinic acid, polyfunctionally-substituted aromatic chelants (such as 1,2-dihydroxy-3,5-disulfobenzene (Tiron)), or mixtures thereof.

Enzymes

In some aspects, the composition comprises from about 0.00001% to about 0.01% active enzymes that are stable and effective in a low-pH environment. Suitable enzymes may include proteases, lipases, and carbohydrases, including amylases and cellulases.

Perfumes

The compositions of the present disclosure may comprise perfume. The perfume may be an acid-stable perfume.

In some aspects, the compositions disclosed herein may comprise a perfume delivery system. Suitable perfume delivery systems, methods of making certain perfume delivery systems, and the uses of such perfume delivery systems are disclosed in USPA 2007/0275866 A1. Such perfume delivery system may be a perfume microcapsule. The perfume microcapsule may comprise a core that comprises perfume and a shell, with the shell encapsulating the core. The shell may comprise a material selected from the group consisting of aminoplast copolymer, an acrylic, an acrylate, and mixtures thereof. The aminoplast copolymer may be melamine-formaldehyde, urea-formaldehyde, cross-linked melamine formaldehyde, or mixtures thereof. The perfume microcapsule's shell may be coated with one or more materials, such as a polymer, that aids in the deposition and/or retention of the perfume microcapsule on the site that is treated with the composition disclosed herein. The polymer may be a cationic polymer selected from the group consisting of polysaccharides, cationically modified starch, cationically modified guar, polysiloxanes, poly diallyl dimethyl ammonium halides, copolymers of poly diallyl dimethyl ammonium chloride and vinyl pyrrolidone, acrylamides, imidazoles, imidazolinium halides, imidazolium halides, poly vinyl amine, copolymers of poly vinyl amine and N-vinyl formamide, and mixtures thereof. The perfume microcapsule may be friable and/or have a mean particle size of from about 10 microns to about 500 microns or from about 20 microns to about 200 microns. In some aspects, the composition comprises, based on total composition weight, from about 0.01% to about 80%, or from about 0.1% to about 50%, or from about 1.0% to about 25%, or from about 1.0% to about 10% of perfume microcapsules. Suitable capsules may be obtained from Appleton Papers Inc., of Appleton; Wisconsin USA. Formaldehyde scavengers may also be used in or with such perfume microcapsules.

Fluorescent Whitening Agent/Brightener

The compositions of the present disclosure may comprise a fluorescent whitening agent or a brightner. Fluorescent whitening agents useful herein include those that are compatible with an acidic environment, such as Tinopal CBS-X.

Suds-Supressor

In some aspects, the compositions are essentially free of suds suppressor. In some aspects, the compositions comprise less than or equal to about 0.02% suds suppressor. Examples of suds suppressors useful herein include silica/silicone type, silicone oil, branched alcohols, or mixtures thereof. In some aspects, the composition comprises from about 0.05% about 1%, or from about 0.1% to about 0.4% suds suppressors.

Soil Suspension Polymers

The compositions of the present disclosure may contain a soil suspension polymer; as described above, some polyamine soil suspension polymers may contribute to chemical stability of the composition or suds benefits in addition to offering cleaning benefits. In some aspects, the soil suspension polymer is selected from PEI ethoxylates, HMDA diquaternized ethoxylates, sulfonated derivatives thereof, hydrophobically modified anionic copolymers, amphiphilic graft polymers, or mixtures thereof. Examples of hydrophobically modified anionic copolymers useful herein include Acusol 480 ®, commercially available from Rohm and Haas and Alcosperse® 725 and 747 and Alcogum L520, commercially available from Alco Chemical. Suitable polymers are described in, for example, U.S. Pat. No. 7,951,768, incorporated herein by reference.

Soil Release Polymers

The compositions of the present disclosure may contain a soil release polymer. In one aspect, the soil release polymer is a PET alkoxylate short block copolymer, anionic derivatives thereof, or mixtures thereof.

Dye Transfer Inhibitors

The compositions of the present disclosure may contain dye transfer inhibitors and/or dye fixatives. Examples of dye transfer inhibitors useful herein include polyvinylpyrrolidone, poly-4-vinylpyridine-N-oxide, copolymers of N-vinyl-2-pyrrolidone and N-vinylimidazole, or mixtures thereof. Useful dye fixatives are disclosed in U.S. Pat. No. 6,753,307.

Fabric Softening Additives

In some aspects, the composition is substantially free of fabric softening additives. In some aspects, the compositions of the present disclosure comprise a fabric softening additive. Examples of fabric softening additives useful herein include alkyl quaternary ammonium compounds, ester quaternary ammonium compounds, silicones, cationic silicones, or mixtures thereof.

Rheology Modifiers

The compositions of the present disclosure may contain a rheology modifier. Rheology modifiers useful herein include methylcellulose, hydroxypropylmethylcellulose, xanthan gum, gellan gum, guar gum and hydroxypropyl guar gum, succinoglycan, trihydroxystearin, or mixtures thereof. Suitable thickners include are methylcellulose and hydroxypropylmethylcellulose thickeners available under the Methocel® trade name from Dow Chemical and Alcogum L520 from Akzo Nobel. The detergent compositions of the present disclosure may comprise from about 0.01% to about 3%, or from about 0.02% to about 2%, or from about 0.05% to about 1%, or from about 0.1% to about 0.5%, by weight of the composition, of a rheology modifier.

Structurant

In some aspects of the present disclosure, the liquid laundry detergent compositions comprise a structurant. Suitable structurants include those disclosed in USPN 2006/0205631A1, 2005/0203213A1, 7294611, 6855680. U.S. Pat. No. 6,855,680 defines suitable hydroxyfunctional crystalline materials in detail. Non-limiting examples of useful structurants include those selected from: hydrogenated castor oil; derivatives of hydrogenated castor oil; microfibrillar cellulose; hydroxyfunctional crystalline materials, long-chain fatty alcohols, 12-hydroxystearic acid; clays; or mixtures thereof. In some aspects, the structurant is hydrogenated castor oil. In some aspects, alternatively, low molecular weight organogellants can be used. Such materials are defined in: Molecular Gels, Materials with Self-Assembled Fibrillar Networks, Edited by Richard G. Weiss and Pierre Terech.

Inorganic Salt

The composition may comprise inorganic salt. It has been found that inorganic salt may provide stability benefit to sulfated surfactant compositions. Certain inorganic salts may also help to build viscosity. The inorganic salt may comprise an alkali metal, an alkali earth metal, ammonium, or mixtures thereof. In some aspects, the inorganic salt comprises sodium, potassium, magnesium, calcium, ammonium, or mixtures thereof. The inorganic salt may comprise a halide, a sulfate, a carbonate, a bicarbonate, a phosphate, a nitrate, or mixtures thereof. In some aspects, the inorganic salt is sodium chloride, magnesium chloride, calcium chloride, sodium sulfate, magnesium sulfate, calcium sulfate, or mixtures thereof; in some aspects, the inorganic salt is sodium chloride, sodium sulfate, or mixtures thereof. The composition may comprise from about 0.1%, or from about 0.5%, to about 5%, or to about 3%, or to about 2%, or to about 1%, by weight of the composition, of inorganic salt.

Carbohydrates

In some aspects, the composition is substantially free of carbohydrates, or of saccharides, or of oligosaccharides, or of malto-oligosaccharides.

Viscosity

The detergent compositions herein may be in the form of gels or liquids, including heavy duty liquid (HDL) laundry detergents. In some aspects, the compositions have a viscosity greater than about 100 cps measured at 20 $s^{-1}$ at 21.1° C. In some aspects, the compositions have viscosities of from about 150 cps to about 5000 cps, or from about 200 cps to about 1500 cps, or from about 225 cps to about 1200 cps, or from about 250 cps to about 800 cps, measured at 20 $s^{-1}$ at 21.1° C.

As used herein, unless specifically indicated to the contrary, all stated viscosities are those measured at a shear rate of 20 $s^{-1}$ at a temperature of 21.1° C. Viscosity herein can be measured with any suitable viscosity-measuring instrument, e.g., a Carrimed CSL2 Rheometer.

Stability

According to the present disclosure, it is believed that alkoxylated polyamine compounds decrease the rate of hydrolysis of sulfated surfactants in detergent compositions. Therefore, the compositions of the present disclosure are generally chemically stable, meaning that in some aspects, after storage at 55° C. for 6 weeks, the composition has a change in sulfate ion ("sulfate") of less than about 10,000 ppm, or less than about 7,500 ppm, or less than about 5,000 ppm, or less than about 2,500 ppm, or less than about 1,000 ppm. (Sulfate ion is a byproduct of the hydrolysis reaction of the sulfated surfactants.) In some aspects, after storage at 55° C. for 6 weeks, the composition has a change in sulfate of less than about 25%, or less than about 20%, or less than about 15%, or less than about 10%, or less than about 5%, or less than about 2%, by weight of sulfate. Change in sulfate as used herein can be determined according to the method described below.

The compositions may also be physically stable. In order to test a composition for physical stability/phase separation, the composition is loaded into 10 mL vials and kept at 10° C., 25° C., and 40° C. for seven days. After seven days at each of the various temperatures, the vials are examined for phase separation. A composition is determined to be phase stable at a particular temperature if (i) the composition remains free from splitting into two or more layers or (ii) it splits into layers but the major layer comprises at least 90% or at least 95% of the composition by weight.

Method of Making

The compositions of the present disclosure can be formulated according to conventional methods. For example, provide the sulfated surfactant in a batch. Blend in the organic acid with an agitator. Once blended, add about 80% of the water. Titrate with base to desired pH. Add the otheringredients (e.g., polymers, nonionic surfactant, chelants, dyes, perfumes, etc.). Measure pH and adjust as needed with base. Balance with the remaining water.

For formulations comprising multiple anionic surfactants, add about 80% of the composition's water to a batch tank. Add about 80% of the composition's base (e.g., NaOH or MEA). Gently agitate. Add chelant and nonionic surfactants. While mixing, add the HLAS, C12TMAC, and AES sequentially; ensure each is fully homogenized before adding. Continue agitating until the surfactants are completely blended; while blending, the agitation may be increased. Once the surfactants are completely blended, the remaining adjuncts are added (e.g., polymers, dyes, perfumes, etc.). Add the organic acid and titrate to the desired final neat pH by adding parts of the remaining base. Balance with the remaining water.

The composition may also be made in a continuous loop process, wherein all ingredients are combined into the loop or, alternatively, two or more ingredients are combined prior to entering the loop. Small amounts of composition are then removed, and the remainder continues in the loop reactor. The loop reactor may have a recirculation ratio of at least 1:10.

Other non-limiting examples of processes suitable for preparing the present compositions are described in U.S. Pat. No. 4,990,280; U.S. 20030087791A1; U.S. 20030087790A1; U.S. 20050003983A1; U.S. 20040048764A1; U.S. Pat. Nos. 4,762,636; 6,291,412; U.S. 20050227891A1; EP 1070115A2; U.S. Pat. Nos. 5,879,584; 5,691,297; 5,574,005; 5,569,645; 5,565,422; 5,516,448; 5,489,392; and 5,486,303, all of which are incorporated herein by reference.

Method of Use

The detergent compositions of the present disclosure may be used to clean, treat, and/or pretreat a fabric. In some aspects, the present disclosure provides a method of treating a surface, comprising the step of contacting the surface with the detergent compositions of the present invention. Typically at least a portion of the fabric is contacted with the aforementioned detergent compositions, in neat form or diluted in a liquor, e.g., a wash liquor, and then the fabric may be optionally washed and/or rinsed. In one aspect, a fabric is optionally washed and/or rinsed, contacted with the aforementioned detergent compositions and then optionally washed and/or rinsed. In another aspect, the detergent composition is applied onto the soiled fabric and left to act on the fabric before the fabric is washed. The composition may remain in contact with the fabric until dry or for a longer period of time, or for a period of about 1 minute to about 24 hours, or about 1 minute to about 1 hour, or about 5 minutes to about 30 minutes. For purposes of the present disclosure, washing includes, but is not limited to, scrubbing, brushing, and mechanical agitation. Typically after washing and/or rinsing, the fabric is dried. The fabric may comprise most any fabric capable of being laundered or treated. The washing may take place, for example, in a conventional fabric laundering automatic washing machine or by a hand washing method. An effective amount of the detergent composition may be added to water to form aqueous laundering solutions that may comprise from about 200 to about 15,000 ppm or even from about 300 to about 7,000 pm of detergent composition.

EXAMPLES

The following examples are included for purposes of illustration and not limitation. All percentages are percent by weight of the composition.

Table 1. Stability Data

Chemical stability is determined by the relative change in sulfate ion ("sulfate") concentration, before and after storage. Neat, undiluted samples of the product are prepared for storage by filling two thirds of a 250 mL wide-mouthed plastic jar (available from Nalgene) and sealing tightly with a polypropylene plastic lid. The filled, sealed jars are stored at 55° C. for 6 weeks, in darkness without agitation. Sulfate concentrations are measured in ppm (parts per million) of sulfate ion, determined before and after storage, according to the following method.

Sulfate ion concentration is assayed using high-performance anion-exchange liquid chromatography. The stationary phase used for separation is a commercially available anion exchange column, based on latex prepared with a glycidoxystyrene monomer quaternized with methlydiethanolamine. Detection of sulfate is achieved using a suppressed conductivity detector. Quantification is achieved using an external linear calibration curve prepared by assaying standards of known concentrations at 5, 10, 20, 40, 80, and 160 ppm of sulfate. Specificity for sulfate is confirmed by using sulfate-spiked control samples of the product being analyzed. HPLC-grade de-ionised water, filtered and degassed, is used as diluent for standards and samples. Product samples to be analyzed are diluted as necessary to fit within the calibration curve concentrations, and filtered through a 0.45 μm pore size nylon syringe filter, after mixing thoroughly with the diluent water for 30 mins.

A suitable set of assay conditions are: the Dionex ICS-5000 Ion Chromatography Instrument System (Thermo Scientific, Bannockburn, Illinois), with the Dionex IonPac AS11-HC 4 mm×25 mm column (Thermo Scientific, Bannockburn, Illinois), operating with the column temperature at 30° C., and sulfate eluted isocratically using an aqueous sodium hydroxide solution mobile phase of 30 mM [OH—], at a flow rate of 1.0 mL/min. The sample injection volume is 10 μL, the suppressor current is 100 mA, and the run time is 15 minutes.

If any modifications to these assay conditions are required (e.g., the use of gradient elution in order to spread out overlapping peaks in a particular product sample), then the modified conditions must achieve specificity for sulfate within the product matrix. This specificity is determined and demonstrated via a sulfate spiking experiment under the modified conditions.

TABLE 1

| Ingredients | Example 1 (nil-polyamine) | Example 2 | Example 3 |
|---|---|---|---|
| AES | 10.50% | 10.50% | 10.50% |
| HLAS | | | 1.00% |
| Nonionic surfactant (C12-14 EO9) | | 2.00% | 2.00% |
| Alkoxylated Polyamine* | — | 1.87% | 1.87% |
| Citric Acid | 8.43% | 8.43% | 8.43% |
| MEA | 0.28% | 0.28% | 0.93% |
| Solvent (ethanol, pdiol, DEG) | 3.82% | 3.82% | 3.82% |
| NaOH | 0.12% | 0.12% | 0.12% |
| Softening agent** | | | 0.08% |
| DTPA | | | 0.3% |
| NaCl | | | 2.00% |
| Brightener*** | | | 0.12% |
| Water | | To balance | |
| pH (neat) | 2.5 | 2.5 | 2.5 |
| Chemical stability measure (change in ppm of sulfate) | 11000 ppm | 8000 ppm | 800 ppm |

*PEI 600 E20, available from BASF

**Lauryl trimethyl ammonium chloride, available from Akso-Nobel

***Disodium 4,4'-bis-(2-sulfostryl)biphenyl, available from Ciba Specialty Chemicals as BR49

In Table 1, Examples 2 and 3, which comprise alkoxylated polyamine, show smaller changes in ppm of sulfate compared to Example 1, which is nil-alkoxylated polyamine.

TABLE 2

| Ingredients | Example 4 (nil-polyamine) | Example 5 | Example 6 |
|---|---|---|---|
| AES | 10.50% | 10.50% | 10.50% |
| HLAS | | | 1.00% |
| Nonionic surfactant (C12-14 EO9) | | 2.00% | 2.00% |
| Alkoxylated Polyamine (2) | — | 3.00% | |
| Alkoxylated Polyamine (3) | | | 3.00% |
| Citric Acid | 8.43% | 8.43% | 8.43% |
| MEA | 0.41% | 0.48% | 0.42% |
| Solvent (ethanol, pdiol, DEG) | 3.82% | 3.82% | 3.82% |
| NaOH | 0.12% | 0.12% | 0.12% |
| pH (neat) | 2.5 | 2.5 | 2.5 |
| Chemical stability measure (change in ppm of sulfate) | 5798 | 4220 | 4287 |

*Alkoxylated Polyamine (2): zwitterionic ethoxylated quaternized sulfated hexamethylene diamine, as described in WO 01/05874 and available from BASF

*Alkoxylated Polyamine (3): polymer having a 600 g/mol molecular weight polyethylenimine core with 24 ethoxylate groups per —NH and 16 propoxylate groups per —NH (PEI 600 EO24 PO6); available from BASF In Table 2, Examples 5 and 6, which comprise alkoxylated polyamine, show smaller changes in ppm of sulfate compared to Example 4, which is nil-alkoxylated polyamine.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A detergent composition comprising:

from about 1% to about 50% of a sulfated surfactant selected from the group $R'—O—(C_2H_4O)_n—SO_3M$, $ROSO_3^-M^+$, and mixtures thereof, wherein R' and R are alkyl groups having 14 or more carbons, wherein n is from about 1 to 20, and wherein M is a salt-forming cation;

an organic acid comprising citric acid;

a fluorescent whitening agent; and from about 0.25% to about 10% of an alkalizing agent;

wherein the composition has a pH of about 2 to about 3 when measured neat;

wherein the composition is substantially free of sulfated surfactant according to R'—O—$(C_2H_4O)_n$—$SO_3M$ and $ROSO_3^-M^+$, wherein R' and R are alkyl groups having fewer than 14 carbons; and wherein the composition is substantially free of peroxide bleach.

2. The composition of claim 1, wherein the composition comprises from about 8% to about 20% of sulfated surfactant.

3. The composition of claim 1, wherein the composition comprises from about 1% to about 12% of organic acid.

4. The composition of claim 1, wherein the organic acid further comprises lactic acid, acetic acid, or a combination thereof.

5. The composition of claim 1, wherein the composition has a reserve acidity of NaOHg/100 g product to pH 7 of at least about 1.

6. The composition of claim 1, wherein the composition has a change of less than about 10,000 ppm of sulfate ion after storage at 55° C. for 6 weeks.

7. The composition of claim 1, wherein said alkalizing agent is an alkanolamine.

8. The composition of claim 1, wherein the neat pH is from about 2.0 to 3.0.

9. The composition of claim 7, wherein the alkanolamine comprises methanolamine, triethanolamine, or a mixture thereof.

10. The composition of claim 9, wherein the alkanolamine is present at a level of about 0.25% to about 5% by weight of the composition.

11. The composition of claim 1, wherein the sulfated surfactant comprises R'—O—$(C_2H_4O)_n$—$SO_3M$, wherein R' is an alkyl group having 14 or more carbons, wherein n is from about 1 to 20, and wherein M is a salt-forming cation.

12. The composition of claim 1, wherein the sulfated surfactant comprises $ROSO_3^-M^+$, wherein R is an alkyl group having 14 or more carbons and wherein M is a salt-forming cation.

* * * * *